(12) United States Patent
Fagrell et al.

(10) Patent No.: US 6,614,010 B2
(45) Date of Patent: Sep. 2, 2003

(54) MICROWAVE HEATING APPARATUS

(75) Inventors: Magnus Fagrell, Uppsala (SE); Per Olov G. Risman, Härryda (SE)

(73) Assignee: Personal Chemistry I Uppsala AB, Uppsala (SE)

( * ) Notice: Subject to any disclaimer, the term of this patent is extended or adjusted under 35 U.S.C. 154(b) by 91 days.

(21) Appl. No.: 09/791,789

(22) Filed: Feb. 26, 2001

(65) Prior Publication Data

US 2002/0027135 A1 Mar. 7, 2002

Related U.S. Application Data

(60) Provisional application No. 60/185,059, filed on Feb. 25, 2000.

(51) Int. Cl.[7] ............................................... H05B 6/74
(52) U.S. Cl. ..................... 219/690; 219/750; 219/751
(58) Field of Search ............................ 219/750, 751, 219/745, 748, 749, 690, 694, 696; 422/21

(56) References Cited

U.S. PATENT DOCUMENTS

| | | | |
|---|---|---|---|
| 2,427,100 A | | 9/1947 | Kihn |
| 3,939,320 A | * | 2/1976 | Saad ........................... 219/751 |
| 4,276,462 A | * | 6/1981 | Risman ....................... 219/694 |
| 4,681,740 A | | 7/1987 | Commarmot et al. |
| 4,711,983 A | | 12/1987 | Gerling |
| 4,777,336 A | | 10/1988 | Asmussen |
| 5,308,944 A | | 5/1994 | Stone-Elander et al. |
| 5,393,492 A | | 2/1995 | Di Martino et al. |
| 5,512,736 A | * | 4/1996 | Kang et al. .................. 219/750 |
| 5,837,978 A | | 11/1998 | Hatzakis, Jr. et al. |
| 6,268,596 B1 | * | 7/2001 | Lauf et al. ................... 219/751 |

FOREIGN PATENT DOCUMENTS

| | | |
|---|---|---|
| EP | 0552807 A1 | 7/1993 |
| NL | 75431 | 3/1954 |
| WO | WO 9917588 | 4/1999 |
| WO | WO 0003564 | 1/2000 |

* cited by examiner

Primary Examiner—Philip H. Leung
(74) Attorney, Agent, or Firm—Harness, Dickey & Pierce, P.L.C.

(57) ABSTRACT

The present invention relates to an apparatus for heating a sample, such as chemical reaction mixtures, whose dielectric properties varies during the heating process. In particular, the present invention relates to a microwave heating apparatus comprising a microwave generator, a waveguide for guiding the generated microwaves to an applicator, and a deflector formed by a closed loop defining a plane, said deflector having an inherent resonance frequency and a thickness in a direction normal to said plane, the deflector being rotatable around an axis being at least substantially parallel to said plane, the deflector being positioned in the waveguide so as to form a resonant cavity with the sample and the waveguide applicator. The resonance conditions of the resonant cavity and the coupling factor of radiation from the waveguide to the cavity are easily adjustable by rotation of the deflector. The resonance conditions and the coupling factor can be adjusted in response to the dielectric properties of the sample in order to optimise the amount of absorbed power and thereby obtain control of the sample heating process.

27 Claims, 11 Drawing Sheets

MICROWAVE HEATING APPARATUS

CROSS-REFERENCE TO RELATED APPLICATION

This U.S. nonprovisional patent application claims priority upon U.S. Provisional Patent Application Ser. No. 60/185,059 filed on Feb. 25, 2000.

FIELD OF THE INVENTION

The present invention relates to an apparatus for heating a sample, such as chemical reaction mixtures, whose dielectric properties varies during the heating process. In particular, the present invention relates to a microwave heating apparatus comprising a resonant cavity in which the resonance conditions and the coupling factor of radiation to the cavity are easily adjustable. The resonance conditions and the coupling factor can be adjusted in response to the dielectric properties of the sample in order to optimise the amount of absorbed power and thereby obtain control of the sample heating process.

BACKGROUND OF THE INVENTION

One of the major obstacles for an organic chemist today is the time consuming search for efficient routes in organic synthesis. The challenges for the pharmaceutical industries and the organic chemist include identification of ways of reducing time in drug development, identification of ways of creating chemical diversity, development of new synthesis routes and maybe reintroduction of old "impossible" synthetic routes. Also, it is a constant challenge to reach classes of totally new chemical entities.

Chemical reactions are often performed at elevated temperature to enhance the speed of the reaction or supply enough energy to initiate and maintain a reaction. Microwaves assisted chemistry offers a way to perform reaction processes and circumventing at least some of the above-mentioned problems, namely speeding up the reaction time with several orders of magnitudes, improving the yield of chemical reactions, offering higher purity of the resulting product due to rapid heating and thereby avoiding impurities from side reactions, and performing reactions that are not possible with conventional thermal heating techniques.

Recent developments have lead towards apparatuses comprising a microwave generator, a separate applicator for holding the sample to be treated, and a waveguide leading the generated microwave radiation from the generator and coupling it into the applicator. Even if the system consists of a 2450 MHz, $TE_{10}$ waveguide to which a magnetron generator is connected in one end and the sample container is in the other end, there is a need for a matching device in the form of at least a metal post or iris between the generator and load, in order to achieve a reasonable efficiency.

When coupling electromagnetic radiation such as microwaves from a source to an applicator, it is important to match the waveguide impedance and the applicator impedance (with sample) in order to achieve a good transfer of power. However, the dielectric properties of the sample will influence drastically upon the impedance of the applicator, as well as its electrical size, and the dielectric properties of the sample often change considerably with both temperature and applied frequency. Thus, an impedance mismatch between the source and the applicator will often occur and the coupling and thereby the heating process becomes less efficient and difficult to predict U.S. Pat. No. 5,837,978 discloses a microwave heating system applying a resonant multimode applicator comprising means for impedance matching during a heating process in order to achieve resonance of the system. The matching or tuning is carried out by adjusting the height of the applicator and the position of a microwave antenna/probe in the applicator (see e.g. column 7, lines 17–24 or column 8, lines 33–39).

In multimode cavities, the electric field is a superposition of several longitudinal modes and several transverse modes. When a multimode applicator is tuned to resonance, one changes the balance between these modes and thereby the spatial energy distribution. The energy distribution is therefore neither spatially uniform nor constant during the heating process, which makes it difficult to obtain reproducible results since a small change of the position or size of the sample, or a resonance tuning (performed by the user or by a change in the dielectric properties of the sample), will result in different power absorption. Rotation of the sample in the oven does not significantly improve the reproducibility, since some of the modes, as a matter of fact most of the modes in a true multimode system, have a tendency to heat the outer parts of the sample more strongly. This leads to a position dependent heating of the sample, which is also dependent upon the resonance tuning. The samples used in microwave chemistry typically have volumes ranging from a few $\mu L$ to ~10 mL, and it is therefore crucial to have a uniform and known energy distribution.

WO 99/17588 discloses a microwave oven having a conductive member for controlling the feeding of microwave power from a waveguide to a multimode applicator. The conductive member acts as a diffracting resonator and provides a local region with a particular field pattern. When the member is rotated, the field changes, giving rise to an advantageous feeding of microwave power to the multimode applicator. The conductive member is preferably an elliptic ring member.

EP 552 807 A1 discloses a similar microwave oven having a rotatable metal reflector in a waveguide for impedance matching between the waveguide and a heating chamber.

Single mode applicator resonators offer a possibility of high field intensities, high efficiency and uniform energy distributions. The use of single mode applicators have been reported, see e.g. U.S. Pat. No. 5,393,492 and U.S. Pat. No. 4,681,740. However, since the dielectric properties of the sample changes the resonance frequency and since magnetrons usually only provide a fixed frequency or only a minor adjustment around the centre frequency of the magnetron, the generated frequency and the resonance frequency of the mode will detune as the sample heats. Thereby the high intensity in the resonant mode is lost.

U.S. Pat. No. 2,427,100 and NL Octrooi No. 75431 both discloses means for adjusting the point impedance, or wave reflection, in microwave waveguide transmission systems by having a conducting deflector rotatably mounted in the waveguide. Both systems tune the waveguide system by introducing a reactance into the waveguide. Note that only the scattering, i.e. reflection of a specific waveguide mode, is affected.

U.S. Pat. No. 4,777,336 discloses a method for controlling heating patterns in single or multimode applicators by tuning the applicator using a probe or sliding shorting plates within the applicator.

It is generally a disadvantage of the multimode applicators that the spatial energy distribution changes when it is tuned for impedance matching.

It is another disadvantage of the multimode applicators that the applicator has a non-uniform energy distribution.

It is a further disadvantage of the multimode applicators that the multimode heating pattern is not reproducible (i.e. very sensitive to its dimensions) and may change as a function of the temperature of the load.

It is a disadvantage of the prior art single mode applicator apparatuses that there are no efficient and durable means for tuning the resonance frequency in response to the dielectric properties of the load, since galvanic contacting by for example screw posts or metal vanes is needed for efficient control of also small coupling factors and the air distances to the waveguide walls tend to become so small that there is a risk of arcing.

SUMMARY OF THE INVENTION

In view of the foregoing, an object of the present invention is to provide a microwave heating apparatus wherein the samples can be uniformly heated by using a single mode applicator.

Another object of the present invention is to provide a microwave heating apparatus that has a high efficiency in that the coupling of radiation to a sample held in the applicator is improved.

Still another object of the present invention is to provide a microwave heating apparatus wherein coupling to a single mode applicator and a resonance frequency of the applicator can be adjusted in response to variations in dielectric properties of a sample in the applicator using a single rotatable deflector.

In a first aspect, the present invention provides a heating apparatus comprising:

generating means for generating electromagnetic radiation at a wavelength, a waveguide for guiding the generated electromagnetic radiation to a waveguide applicator for holding a sample to be heated, the sample having dielectric properties $\epsilon_{sample}$ which varies as a function of a temperature of the sample, the waveguide and the waveguide applicator supporting a single normal transverse mode, a deflector formed by a closed loop defining a plane, said deflector having a resonance frequency $v_{defl}$ and a thickness in the interval $[\lambda/30; \lambda/5]$ in a direction normal to said plane, the deflector being rotatable around an axis being at least substantially parallel to said plane, the deflector being positioned in the waveguide so as to form a resonant cavity with the sample and the waveguide applicator, said cavity having at least one resonance frequency $v_{cav}$ being dependent upon at least $\epsilon_{sample}$, $v_{defl}$, and an angle of rotation of the deflector, $\alpha_{defl}$.

In the present context, waveguide should be interpreted as any means capable of guiding electromagnetic waves such as electromagnetic radiation. The waveguide may be a waveguide in the form of metallic channels for guiding waves such as radiation or cables such as coaxial cables for guiding waves such as electrical signals. The waveguide may also comprise active and/or passive components such as couplers, dividers, splitters, combiners, circulators, power meters, artificial samples, spectrum analysers etc.

The waveguide may typically support only a single transverse mode, TE or TM, depending upon its design. The waveguide is preferably connected to the applicator so as to transfer energy from modes in the waveguide to modes in the applicator. In order for the coupling to be efficient, the impedance of the waveguide must be at least substantially matched with the impedance of the applicator, and there may also be a field matching (i.e. possibility of continuous energy transfer by field similarities in the two guides). The coupling of radiation, and hence of energy, from modes in the waveguide to modes in the applicator can, under conditions of field matching, be quantified by the coupling factor defined as the ratio between the impedance of the waveguide and the impedance of the applicator. It is typically desirable to have as good an impedance matching as possible (or equivalently, a coupling factor as close to 1 as possible) under the actual conditions. This impedance matching (or coupling factor optimisation) may be obtained under different conditions depending on different parameters such as the absorbency of the sample and the design of the system. When rotating the deflector for adjusting the coupling factor, one may also adjust the resonance frequency of the cavity $v_{cav}$. However, and as will be shown later, the optimisation of the coupling factor need not be coincident with the tuning of $v_{cav}$ to equal the generated frequency. In a preferred embodiment, both the waveguide and the waveguide applicator preferably supports a $TE_{10}$ mode so that the condition of field matching is fulfilled.

A waveguide applicator is in its simplest form a waveguide terminated by e.g. a short circuit wall, an iris or equivalent, which is adapted to hold a sample to which the microwaves are applied. Thus a waveguide applicator supports the same TE or TM mode as the waveguide of which it is an end-part. Depending on the waveguide and the mode in the waveguide, the applicator need not have the exact same cross-sectional dimensions as the waveguide. Typically, the waveguide supports a $TE_{10}$ mode wherein the electric field has no variations in the vertical direction, hence, in this case only the horizontal dimension (the width) of the waveguide and the waveguide applicator needs to be at least substantially equal. The geometrical constraints between the waveguide and the waveguide applicator for different designs will be obvious for the person skilled in the art bearing the need for field matching in mind.

A single mode applicator is an applicator comprising an applicator cavity adapted to support only a single resonant mode within the frequency spectrum of the applied radiation. Hence, a waveguide applicator is also single mode applicator, and depending on the context, the waveguide applicator may also be denoted a single mode applicator, or simply an applicator.

In order to reach high a high field strength within the applicator, it is preferable that the resonance frequency of the cavity is close to or substantially equal to the frequency corresponding to an amplitude maximum in the generated frequency spectrum. The resonance conditions can be expressed either as a tuning of the reactive impedance (the capacitative and inductive reactance) of the applicator, or as an adaptation of the electrical length of the applicator to make it equal to $\lambda/2$, where $\lambda$ is the wavelength of the applied radiation.

The electric length is a measure of the distance traversed by electromagnetic radiation in a medium in time t, and is approximately equal to the corresponding distance electromagnetic radiation would have traversed in vacuum in the same time t If e.g. a high permittivity medium of length x is inserted in a radiation path, the electrical path length is increased by (n−1)x, where n is the refractive index of the medium.

According to the present invention, the deflector is formed by a closed loop defining a plane. In this plane, the deflector has a width "a" and a height "b". Also in this plane, the material forming the loop has a radial thickness "c". The deflector has an axial thickness "h" along an axis normal to the plane of the deflector. The circumference of an inner perimeter of the closed loop of the deflector determines the inherent resonance frequency $v_{defl}$ of the deflector, and by that the frequency of maximal blocking, when it is placed with its plane perpendicular to the direction of power flow in a waveguide. The deflector may be rotated so as to have its plane perpendicular to (or its axis parallel with) the waveguide where it will efficiently reflect radiation having a frequency equal or close to $v_{defl}$ (blocking position). Also, the deflector may be rotated to a position where its plane is parallel with (or its axis is perpendicular to) the waveguide, where it will only reflect radiation comparable to that of a plate of conducting material having the same profile (open position). In between these positions, the deflector can be characterised by a complex reflection coefficient $R(v, \alpha_{defl})$ depending on the frequency and angle of rotation. Hence $v_{defl}$ and $\alpha_{defl}$ at least partly determine the coupling of radiation between the waveguide and the waveguide applicator. The phase of the complex reflection coefficient varies as a function of the angle of rotation of the deflector. This may be interpreted as that the position of the minimum of the standing (reflected) wave varies with the angle of rotation thereby introducing a phase delay or shift as the deflector is rotated.

As stated previously, the deflector forms a resonant cavity with the waveguide applicator (with sample). As said above, the deflector may affect the electrical distance for at least part of the electromagnetic waves guided towards the applicator so as to virtually change the effective length of the cavity. Since this effect depends in the angle of rotation of the deflector, the resonance frequency of the deflector may be tuned by rotating the deflector.

Since the resonant frequency of the cavity may change when the permittivity of the sample varies, the deflector action may compensate this change, thus keeping the resonant frequency substantially constant and thereby provide a possibility to provide a high microwave heating efficiency.

The complex reflection coefficient of the deflector, the resonance frequency $v_{cav}$ of the cavity, and the coupling of radiation between the waveguide and the cavity are closely related. For illustrative purposes, the tuning of dimensions and the angle of rotation of the deflector may be considered as a balance between coupling radiation to the cavity and keeping the coupled power in the cavity. If for example $v_{defl}=v_{cav}$, the deflector in its blocking position may form a very efficient "end mirror" for resonant radiation in the cavity, however, only very little radiation (having the right frequency $v_{cav}$) may be coupled to the cavity. When the deflector is rotated towards its open position, more radiation may be coupled to the cavity, but on the other hand, the deflector may not form a very efficient "end mirror", and more power may be lost from the applicator. Thus at some position between blocking and open position, a maximum in the power in the cavity may be expected. If on the other hand $v_{defl}$ is very different from $v_{cav}$, radiation having a frequency $v_{cav}$ may efficiently be coupled to the cavity even when the deflector is in its blocking position, but the deflector may not form a very efficient "end mirror". Hence, and a maximum in the power in the cavity may be expected at a $v_{defl}$ which is not equal to but neither too different from $v_{cav}$.

A proper choice of the axial thickness significantly larger than the radial thickness will provide a desirable location change of the phase of the reflected wave when the deflector is rotated. Preferably, the axial thickness of the deflector is in the interval $[\lambda/20; \lambda/10]$, such as within the interval 3 to 25 mm in a 2450 MHz, $TE_{10}$ waveguide with dimensions 86×43 mm (width x height). For waveguides with lower heights, such as 25 mm, the axial thickness must be smaller; a suitable dimension has been found to be about 10 mm. Also in a preferred embodiment, the radial thickness of the deflector is between 0.1 mm and 5 mm.

Preferably, the deflector is shaped like an ellipse having a major principal axis of length a and a minor principal axis of length b. Alternatively, the deflector is shaped like a trapezium, such as a rectangle having a width a and a height b. The choice of the detailed shape of the closed loop depends on the desired "leakage properties", where an elliptical shape may give maximum blocking according to the prior art.

For a predetermined set of conditions such as sample volume, sample permittivity, position of the sample in the applicator, and coupling of the guided waves between the waveguide and the applicator, the applicator may become anti-resonant. In this case, the resonance frequency of the applicator and/or the coupling of the guided waves between the waveguide and the applicator may be adjusted by comprising a member of a material having a relative permittivity larger than 5, such as larger than 10, preferably larger than 25 positioned within the applicator. In order to prepare relative permittivity of the material, it may comprise ceramic materials comprising one or more materials selected from the group consisting of $Al_2O_3$, $TiO_2$ or $XTiO_3$, where X is any group II element such as Ca or Mg. The relative permittivity and/or the shape and/or the size of said member might be chosen so as to make the applicator resonant at said predetermined set of conditions.

Optionally, the apparatus may further comprise means for adjusting the position of the sample in the applicator in order to adjust the effect of the sample upon the resonance frequency of the cavity and/or the coupling of the guided waves between the waveguide and the applicator. Preferably, the means for adjusting the position of the sample comprises means for adjusting a substantially vertical position of said supporting means.

In order to reduce the amount of scattered waves towards the generator, the apparatus may further comprise a first circulator and a first dummy load, wherein the first circulator is adapted to deflect at least part of electromagnetic waves reflected from the applicator towards the first dummy load. One or more power measuring means may be positioned so as to measure the power of at least part of the electromagnetic waves deflected by the first circulator. The one or more power measuring means is preferably operationally connected to a first memory means for storing the measured power.

The generator may comprise a magnetron or a semiconductor based generator and a semiconductor based amplifier. The semiconductor-based amplifier preferably comprises one or more silicon-carbide power transistors. Alternatively, the generator may comprise both a magnetron and a semiconductor based generator.

The sample is preferably held in a container which is substantially hermetically closed and adapted to withstand pressure.

Also, it is often of interest to monitor the temperature of the sample during heating. For this purpose, the apparatus may comprise a thermal radiation sensitive element adapted to determine a temperature of the sample and positioned so as to receive thermal radiation emanating from the sample.

Both the high pressures and the high temperatures of the sample imply a risk for the container to break and thereby leak sample in the applicator. The breaking of the container can be such as an explosion or simply a melting of the container. In order to protect the deflector and the waveguide in case of breaking of the container, the apparatus may comprise a screen for separating the deflector and the waveguide from the container so as. The screen is preferably substantially transparent to the electromagnetic waves guided towards the applicator, and may comprise one or more of the materials selected from the group consisting of: PTFE (Teflon®) TPX, polypropene or polyphenylidene-sulphide (PPS, Ryton®). Optionally, the applicator also comprises a drain for draining sample from within the applicator. Preferably, the drain leads to a receptor for receiving the sample drained from the applicator.

The apparatus may be further automated by comprising means for placing the sample within the applicator. If the sample is loaded into the container outside the apparatus, the placing means is means for placing the container at least partly within the applicator.

In order to allow for a larger variation in the power and/or frequency of the generated waves, the apparatus may further comprise a second generating means for generating electromagnetic waves. In this case the waveguide is adapted to guide at least part of the electromagnetic waves generated by the first and second generating means to the applicator. In order to allow parallel processing of samples, the apparatus may further comprise a second applicator for holding a container holding a second sample. In this case the waveguide is adapted to guide at least part of the electromagnetic waves to the first and second applicator. The second applicator may also comprise all the features described in relation to the applicator above. The combination of two or more generators and two or more applicators allows for a large system wherein the generated power is dosed to each applicator individually.

The term microwave is intended to mean electromagnetic radiation in the frequency range 300 MHz–300 GHz. Preferably, the apparatus and methods according to the invention are performed within the frequency range of 500 MHz–300 GHz, preferably within the frequency range 500 MHz–30 GHz such as 500 MHz–10 GHz such as 2–30 GHz such as 300 MHz–4 GHz such as 2–20 GHz such as 0,5–3 GHz or within the range 50–100 GHz.

In the present context, the term "apparatus" designates one or several pieces of equipment which, as a whole, comprise the parts, means and elements that characterise the invention. Accordingly, the apparatus may appear as a distributed system where individual parts or means are not located in close physical proximity to each other. As an example of this architecture, the memory means may be physically located on e.g. a personal computer (PC) while all the mechanical parts may appear as a joint unit.

In a second aspect, the present invention provides a method for applying the apparatus of the first aspect. Thus, according to the second aspect, the present invention provides a method for heating a sample, said method comprising the steps of:

I. providing a heating apparatus according to the first aspect, and inserting the sample in the applicator, II. generating electromagnetic radiation at a first output power level, III. rotating the deflector for adjusting the coupling factor between the waveguide and the resonant cavity.

When a heating process is initiated, the sample has a first temperature $T_1$. The method preferably further comprises the steps of:

heating the sample to obtain a second temperature $T_2 > T_1$, rotating the deflector for adjusting the coupling factor between the waveguide and the resonant cavity in response to the variation in the dielectric properties esampleof the sample.

The above steps may be repeated several times during a heating process.

The present invention allows for designing and/or optimising of a heating process of a sample. Thus, the method according to the second aspect may further comprise the steps of:

IV. performing the following steps one or more times:
  positioning the deflector in a first position and measuring a first power of electromagnetic radiation reflected from the waveguide applicator, the reflected radiation corresponding to said first position of the deflector,
  rotating the deflector to a second position that is different from the first position and measuring a second power of electromagnetic radiation reflected from the waveguide applicator, the reflected radiation corresponding to said second position of the deflector, and V. determining a preferred position of the deflector based on the amount of power reflected from the waveguide applicator in at least the first and second position.

These measured powers are preferably inversely proportional to the power absorbed in the sample at the first and second position of the deflector. Preferably, this designing and/or optimising are only performed once for each type of sample or reaction since the obtained parameters can be saved for later use. Hence, the method may further comprise the steps of:

VI. providing a first storing means,

VII. storing information relating to the first position in the storing means and storing the measured first power in relation thereto, and VIII. storing information relating to the second position in the storing means and storing the measured second power in relation thereto.

It will often be of interest to store measured powers corresponding to a plurality of different positions, and the steps IV, VII, and VIII may be repeated as often as desired. The deflector angles and the powers may be stored as a listing such as a table, in the storing means. According to the second aspect, step V may comprise processing of the stored measured powers for determining the preferred position of the deflector corresponding to a local or an absolute minimum in the measured power, or to a predetermined ratio of the measured power to the first output power level.

After the determination of a preferred position of the deflector, the method may further comprise the steps of positioning the deflector in he preferred position in order to heat the sample. Optionally, the method also comprises the step of, after having positioned the deflector in the preferred position, generating electromagnetic radiation at a second output power level which is larger than the first output power level in order to heat the sample at a higher rate.

By comparing the stored measured powers with corresponding stored measured powers measured for a different second sample, it is possible to determine a measure of the relative permittivity of a first sample relative to the relative permittivity of the second sample.

Alternatively, by comparing the stored measured powers with corresponding stored measured powers measured for a second sample of known chemical composition, it is possible to determine an indication of the chemical composition of the first sample relative to the chemical composition of the second sample. If the first sample comprises at least one reactant for performing a chemical reaction, the method may further comprise the steps of:

performing the chemical reaction with the at least one reactant, and determining a degree of reaction for the chemical reaction using the indication of the chemical composition of the sample, where the degree of reaction is a measure of the extent to which the reactants has reacted to form products in a chemical reaction.

DETAILED DESCRIPTION OF FIGURES

Figure 1:
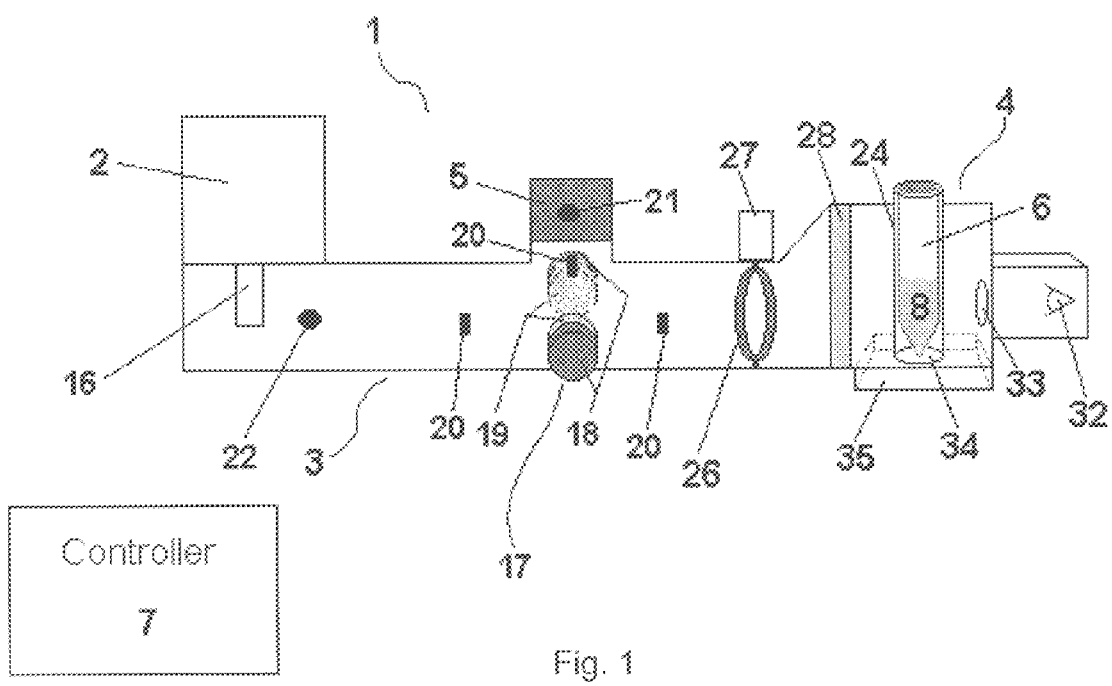
FIG. 1 is a cross sectional view of a first embodiment of the apparatus according to the present invention.

In the following, a specific embodiment of an apparatus according to the invention is described and discussed in greater detail. The present description provides a more detailed description of preferred features of the invention, described in relation to the preferred embodiment. However, it will be understood, and will be realised by the person skilled in the art, that the invention is not limited to the presently discussed embodiment, and that each of the individual features described in the present embodiment could be implemented in many other ways. Also, experiments as well as computer simulations verifying the performance of the present invention is presented.

In a preferred embodiment, the present invention relates to a microwave (MW) heating apparatus for heating a sample with an improved efficiency. The improved efficiency is 15 achieved by applying a number of features including:

a single mode waveguide applicator, means for adjusting a resonance frequency of a resonant cavity in the waveguide applicator in response to the variation in dielectric properties of the sample during heating, in order to make the waveguide applicator resonant and ensure a high field strength inside the waveguide applicator, and means for adjusting the coupling factor of MW radiation between a waveguide and the applicator in order to optimise the radiation coupled to the sample.

As previously mentioned, a single mode applicator is an applicator comprising an applicator cavity, which is adapted to support only a single resonant mode within the frequency spectrum of the applied radiation. In this case, the mode in the applicator is the normal mode in its parallelepipedic shape, namely the $TE_{101}$ first rectangular mode. The normal mode is defined as the first propagating mode, which appears in when the frequency of the generator is increased from 0 Hz. The sample, which can have a substantial and varying permittivity, can modify the details of this mode field pattern, but the quotient between the sample and applicator volumes is still so low that the simple mode pattern essentially remains. The resonance criteria for single mode applicators are in general more critical than for multimode applicators, since the relative strength of the overlapping modes will "automatically" change in a well-designed multimode system when the sample changes, in order to retain a good coupling factor. However, the change of the mode balance also means that the heating pattern in the sample is changed, which results in an inhomogeneous heating. The pattern change is amplified by the fact that a multimode resonant cavity must be much larger in size than a single normal mode applicator in order to support the higher order modes, which means that the resonant frequency bandwidths of each mode become smaller. The spatial energy distribution within a single mode applicator is more uniform having more intense but fewer and remaining maxima than the spatial energy distribution of a multimode applicator. However, if the resonance and the coupling can be controlled, and if the position of the sample is chosen properly, the field strength at the position of the sample can be considerably larger for a single mode applicator compared to multimode applicators. This is due to the fact that a multimode cavity must have a much larger volume than a normal mode applicator. Thereby the power loss in the cavity walls becomes much higher.

FIG. 1 shows a cross sectional view of a preferred embodiment of the present invention. The apparatus has three arms in which a microwave generator 2, an applicator 4, and a dummy load 5 are placed respectively, and a waveguide part 3, forming two of the arms, for guiding the radiation from the generator 2 to the applicator 4. A deflector 26 is positioned in the waveguide 3 near the applicator 4.

The apparatus of the preferred embodiment further comprises a controller 7 such as a computer, which can store and process measured values and control the generator power. Optionally, the controller 7 also monitors parameters such as temperature and time and controls functions such as cooling and deflector position. The controller is operationally connected to the generator 2 and to devices such as the IR-sensor 32, power measuring means 21 and 22, deflector driver 27, cooling means (not shown) and height adjustment means (not shown). The controller has a user interface, allowing the user to set-up a specific heating process.

The microwave generator 2 can be a magnetron or a semiconductor based generator. In the case of a magnetron, the magnetron 2 is mounted on the top of the waveguide 3 with its antenna 16 inserted into the waveguide 3. For the power range 1 to 300 W, the magnetron is preferably characterised by control of the input power with an electromagnetic solenoid, which is used to regulate the magnetron output power by changing the static magnetic field in it. The frequency band is typically centred at either 2450 MHz or 915 MHz. The temperature of the magnetron is preferably measured with a temperature sensor (not shown) and the magnetron is allowed to reach 90° C. as a maximum temperature, again in order to stabilise its operation.

In the case of a semiconductor-based generator (not shown), the generator may also be a semiconductor-based amplifier using e.g. silicon-carbide power transistors. Semiconductor based microwave generators and amplifiers provide a variety of advantages over conventional TWT's (Travelling Wave Tube), gyrotrons and magnetrons. Examples of these advantages are:

Easy control of frequency and output power

Small physical dimensions

No high voltage required, which improves safety and reliability

No warm-up time, therefore immediately availability and possibility of fast variation in output power No wear-out parts which significantly reduce cost maintenance and improve apparatus up-time Far higher MTBF and lower MTTR compared with TWT Better gain curve flatness compared with TWT Lower noise compared with TWT The amplifying means preferably has a signal amplifier and a power amplifier. The signal amplifier is a semiconductor-based device being adapted to amplify the signal from the signal generator. The power amplifier is provided for further amplifying the signal from the signal amplifier, and is also a semiconductor-based device. The gain of the signal and power amplifiers are adjustable and the operator or the controlling device can select the amplitude of the output by setting the gain of the power amplifier.

Since the frequency of the radiation generated by a semiconductor-based generator is variable, it offers further possibilities in optimising the heating procedure in that the frequency can be tuned to an absorption maximum of the sample.

Alternatively, the generator 2 is a combination of a magnetron and a semiconductor based generator (not shown), each operating in different power and/or frequency regimes. This constellation provides a large degree of flexibility and power economy since each generator device may be used for the purpose at which it has its strengths.

Figure 2A:
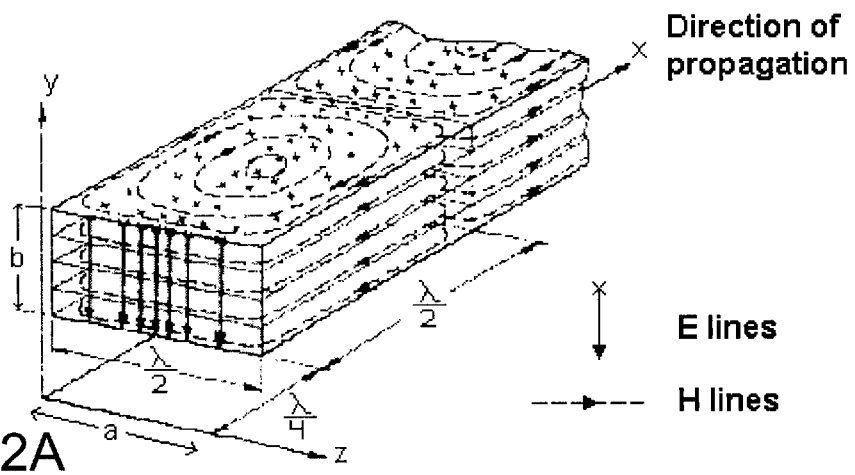
FIG. 2A illustrates electric and magnetic field lines in a waveguide according to the first embodiment of the present invention.

The waveguide 3 in the preferred embodiment is a rectangular waveguide. For a rectangular waveguide, the normal mode is a $TE_{10}$ mode (Transverse Electric Mode) using the following terminology in relation to FIG. 2:

| Coordinate | x | y | z |
|---|---|---|---|
| Waveguide dimension | — | b | a |
| Mode | p | n | m | with $TE_{mn}$ for waveguides and $TE_{mnp}$ for a cavity. In FIG. 2a, the magnetic field is shown as the elliptical dashed lines and the electric field is shown as straight solid lines between the top and the bottom. The wall currents are displayed in FIG. 2b. In the first embodiment, the waveguide has a rectangular cross section, however, other cross sectional shapes such as elliptical can be used.

Figure 2B:
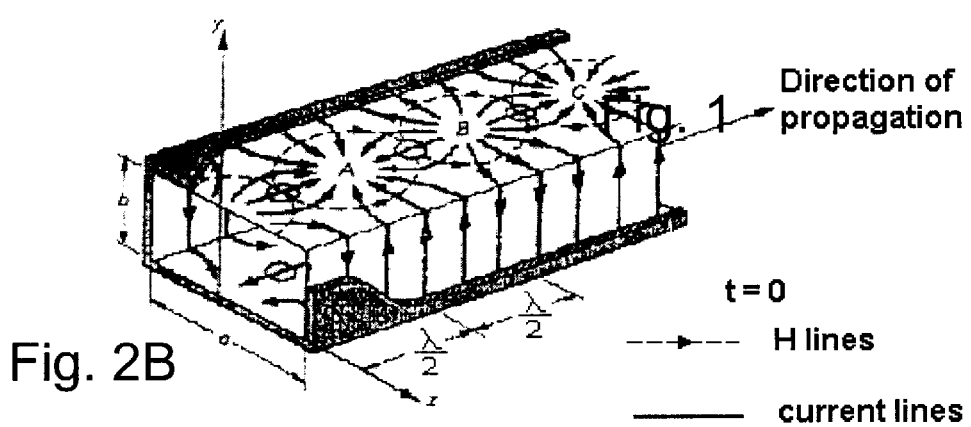
FIG. 2B shows magnetic field lines and currents in the waveguide walls.

Due to the current flow shown in FIG. 2b, there has to be good contact between the side walls and the horizontal parts of both the waveguide and the applicator in order not to leak microwaves. In the first embodiment, a sealing material, consisting of a silicone rubber strip with metal threads around forms this contact. The rubber strip is positioned between the assembled parts.

It is of interest to measure the power applied to and reflected from the applicator. In case where a magnetron is used as generator, it is also of interest to reduce radiation feedback to the generator, which will otherwise cause fluctuation of the operating power and frequency, and reduce the lifetime of the magnetron. For these purposes, the waveguide contains a circulator 17 and two power measuring means 21 and 22.

The circulator 17 comprises two magnets 8, two special ferrites 19 and three stubs (metal posts) 20. The function of the circulator is to direct the electromagnetic radiation in certain directions depending of its direction of propagation. In the present configuration, the circulator is adapted to transmit radiation travelling from the generator 2 towards the applicator 4, but deflect radiation traveling the opposite direction into a dummy load 5. Since the waveguide is essentially symmetric in two of the three arms, the magnets 18 and the ferrites 19 should be placed along a symmetry axis of the circulator and towards the dummy load 5.

The positions of the stubs 20 (one towards the generator 2, one towards the dummy load 5 and one towards the applicator 4) should in principle be symmetrical and the stub close to the dummy load should be optimised so that only −17 to −20 dB is reflected back to the generator. Since the current flows along the axis of the waveguide in the middle of the waveguide (see FIG. 2B), it is possible to leave open slots for adjusting the position of the stubs without microwave leakage. The function of the stubs is to act as a phase compensating capacitance and increase the efficiency of the circulator. Since the dummy load 5 can transfer heat to the circulator 17, the temperature of the circulator is measured with a temperature sensor (not shown) close to the dummy load arm. The maximum temperature allowed for the ferrites is 70° C.

The power sensor 21 is a common crystal detector placed so as to measure the power of the radiation reflected from the applicator and deflected by the circulator into the dummy load arm. Since the dummy load is matched, there are no standing waves in this arm. This means that the signal as measured anywhere in that arm is proportional to only the reflected power by the sample to be heated.

Knowing the losses in the waveguide and the ratio of reflected radiation deflected by the circulator, allows a determination of an estimate of the power $P_{refl}$ reflected from the applicator. The power measuring means 22 is a power-meter placed so as to measure the power of the generated radiation travelling towards the applicator. However, it may also be exposed to radiation reflected from the applicator since the efficiency of the circulator is no 100%. Knowing again the losses in the waveguide and the ratio of reflected radiation transmitted by the circulator, allows a determination of an estimate of the power $P_{reciev}$ received by the applicator.

By determining the powers $P_{refl,0}$ and $P_{reciev,0}$ with an empty sample container (where all power is reflected) at the given power level, the power absorbed by the sample can be determined by:

$$P_{abs} = (P_{reciev} - P_{refl}) - (P_{reciev,0} - P_{refl,0}).$$

Often, the main interest is in the relative power absorbed in the sample for different conditions such as deflector position or temperature. For this purpose, the direct power measured by powermeter 21 is sufficient for determining relative values.

The powers $P_{refl}$ and $P_{reciev}$ are preferably measured as a function of the generated power in the generator, such as the current I supplied to the generator at fixed voltage, or equivalently the voltage or any other parameter characterising the generated power. The generated output power is normally a direct function of the magnetron anode current, which can be measured by the controller 7. Optionally, the deflector may be put in a predetermined position where the applicator is out of resonance (with empty container). Thereby no strong fields occur at the position of the container, and the reading of the true generator power becomes more accurate. Alternatively, an estimate for the power received by the sample, $P_{reciev}$, can be determined directly from the parameter characterising the generated power as described above, making the power measuring means 22 insufficient.

The power measuring procedure described above power absorbed in the sample can be determined using a number of different ways with various positions of powermeters, e.g. inside the applicator. The key feature is to determine an at least approximate value of the power absorbed by the sample.

The power measuring means 21 and 22 are connected to a storage means and preferably also to processor means. Preferably they are connected to the controller 7. Alternatively, the power measuring means themselves comprise both storing and processor means.

The dummy load preferably comprises a material, which absorbs microwaves very efficiently independent of the temperature of the material, such as silicon carbide. The energy is converted into heat, which is led away by a cooling block. The dummy load absorbs the power deflected by the circulator. The position of the dummy load should be nominally at the bottom of the arm.

As can be seen in FIG. 1, the applicator 4 has a larger cross-sectional height than the waveguide 3, however, the cross-sectional width is constant, the same for both the applicator and the waveguide. Due to the full compatibility between the field patterns, the waveguide is a $TE_{10}$ waveguide meaning that the electric field has no variation in the vertical y-direction. Hence, the waveguide will function as a $TE_{10}$ waveguide independently of any height variation. However, a low height is favourable for the circulator function and saves space, and a higher waveguide in the applicator section is desirable since a higher load can then be used. The difference in the height between the waveguide and the applicator is therefore of no influence, and the applicator is simply a terminated waveguide—hence the term waveguide applicator. Such a waveguide applicator is obviously single mode as the waveguide is—hence the term single mode applicator is also used.

For other designs than the one illustrated in FIG. 1, a waveguide applicator may have different constraints to its dimensions, which will be evident for the person skilled in the art.

The applicator as illustrated in FIG. 1 preferably comprises a sample container holder 24, a protection screen 28, a cooling mechanism (not shown), and an IR-sensor 32. The applicator can have a cylindrical opening 34 at the bottom to allow for container explosions to be directed downwards to a removable receptor 35 which can be emptied.

The container holder 24 is a tube of PEEK (poly-eter-eter-keton) for a sample container 6 and protects the container 6 from scratches that could be caused by the applicator when the container is put in place. Scratches on a glass container decrease the maximum pressure allowed before explosion of the container occurs.

Since there is only one resonant $TE_{101}$ mode in the applicator, the position of the sample volume is an important parameter for assuring a good interaction between the sample and the microwaves and thereby optimising the absorbed power in the sample. This is because the electromagnetic field strength of the resonant mode is strongly dependent on the position. The horizontal position of the sample is defined by the position of the container holder 24 and is determined during construction of the apparatus, whereas the vertical position is determined by the volume of the sample 8. Therefore the applicator preferably comprises means for adjusting the vertical position of the sample 8 (not shown in FIG. 1). Such means can be an adjustable supporting plate on which the container 6 rests. Alternatively, the upper rim or the lid of the container 6 rests on the height adjustable upper neck of the container holder 24.

Since the samples can become up to 250° C., the material chosen for the tubing has to be able to withstand at least 250° C. without any mechanical or chemical charges. A typical sample container is a glass vial, dimensioned specifically to withstand pressure without undue deformation. Preferably the container is at least substantially hermetically closed in order to heat samples above the boiling temperature at atmospheric pressure.

The protection screen 28 protects the deflector, the waveguide and part of the interior of the applicator in case of explosion of a container. It is made of an at least substantialy microwave penetrable material such as PTFE (Teflon®), TPX, polypropene or polyphenylidenesulphide (PPS, Ryton®). The dielectric properties of the screen affect the electrical length of the applicator, and the optimal dimension in this first embodiment is approximately 8 mm thickness.

The sample is preferably cooled by cooling the container with pressurised air, which is applied via several outlet holes next to the container at the top of the sample holder (not shown). As an example, the sample is cooled for ten seconds after it has reached 40° C. due to the time lag in the temperature measurements, which will be discussed below.

The IR-sensor 32 is placed so that it monitors the lower part of the container trough an opening 33 in the applicator wall. Preferably, the IR-sensor 32 is unsusceptible to microwaves and need not be protected. However, in order to avoid leakage trough the opening 33, the opening must be secured either by a chimney, a metal grid or a sealed casing for the IR-sensor 32. The IR-sensor should preferably monitor a part of the glass container that is in direct contact with the sample, else large measurement errors may occur. Since the IR-sensor measures the temperature on the surface of the glass there will be a difference between the real temperature (in the sample) and the measured temperature resulting in a time lag of up to 5 seconds for the real temperature measurement. The IR-sensor is sensitive to condensed liquids on its surface since it then will measure the temperature of the contamination and hence it is very important to keep it clean (e.g. after explosions).

The IR-sensor 32 is connected to a storage means and preferably also to processor means. Preferably it is connected to the controller 7.

Providing a deflector 26 in the waveguide 3 near the applicator 4 forms a cavity between the termination of the applicator or the sample and the deflector. Microwaves transmitted by the deflector and having a frequency equal or close to the resonance frequency of the cavity can form standing waves in the cavity. Hence, when mentioning a resonance frequency of the applicator, a resonance frequency of the cavity formed by the applicator, sample, and deflector is actually meant.

Since the volume, real permittivity and loss factor of the sample varies for different temperatures and different samples, the insertion and heating of a sample in the applicator changes the resonant frequency of the cavity. The deflector 26 is adapted to compensate for these differences in dielectric parameters of samples. The deflector 26 as shown in FIG. 3 is formed by a closed loop of a conductive material, and the size and shape are adapted to the size and shape of the waveguide and the applicator. The deflector can be rotated around an axis of rotation intersecting the loop as shown in FIG. 1. The axis of rotation need not be a symmetry axis of the deflector. The varying inductive and capacitative behaviour of the deflector provides adjustment of both its electrical length, and hence the resonance frequency of the applicator, and the coupling factor between the applicator and the waveguide by impedance matching. The loop of the deflector defines a plane, and the thickness of the loop perimeter along an axis normal to this plane is used for modifying the electrical length of the applicator. The circumference of the inner perimeter of the loop determines a resonance frequency of the deflector.

The deflector design is adapted to simultaneously change the electrical position of the deflector (the electrical distance from the applicator end-wall or the sample to the deflector) in the $TEM_{10}$ applicator/waveguide and its scattering/deflection properties when it is rotated. Thus, the rotation of the deflector describes a single curve describing "wave choking" (deflection is decibels) as a function of the electrical position of the deflector. This curve has to be experimentally optimised for the desired range of samples and temperatures during design and construction. The deflective properties are adjusted by changing the size and shape of the elliptical loop. Typically, a remaining transmission should occur in the most blocking position intended for samples with very small absorption capability, since this will result in a lower position sensitivity of the deflector for such samples. The axial thickness of the loop determines how much the electrical position changes when it is rotated; this is what results in its property of changing the resonant frequency of the cavity.

The conductive material of the deflector is preferably aluminium, which should have a high quality since the current density induced in the deflector is high enough to make normal aluminium corrode. The rotation of the deflector is controlled with a step motor 27. The deflector has a twofold symmetry axis and hence the interesting angles are 180 degrees. Optionally, the deflector may also be translated in order to adjust the length of the applicator. Alternatively, the shape of the deflector can be adjusted, or its axis of rotation can be displaced.

The power sensing in the dummy load arm provides an unambiguous indication of the relative (with respect to other deflector positions) applicator efficiency. Hence the power measurement $P_{refl}$ is used for controlling the deflector. The deflector can be swept 180 degrees for determining the angle corresponding to maximum absorption (=minimum reflection) of power in the sample.

Alternatively, the deflector is non-conducting, but made from a high permittivity material (the word deflector is still used even though the deflective properties are more pronounced in case of a conductive material). Adjustment of such a deflector varies the electrical length of the applicator and the capacitive reactance allowing for impedance matching between the applicator and the waveguide.

The deflector can only reduce the volume dependence and not eliminate it completely. At some volume(s), anti-resonance conditions of the applicator with sample may not be compensated for by the deflector, thus there will be a local minimum in the efficiency. In the apparatus according to the invention, such anti-resonance conditions occur at sample volumes of about 3 ml. However, such anti-resonances may be compensated for by including a member adapted to become resonant only at the specific volume of the antiresonance. This member can be a material of which the size, shape, relative permittivity and position within the applicator is adjusted so as to make the applicator resonant at the conditions where the anti-resonance occurs. These conditions can be determined by the sample volume, as mentioned, but can also be at least partly determined by the coupling factor, the resonance frequency of the applicator, the chemical composition or the temperature of the sample, the container or other parameters. Preferably, the material of the member has a high relative permittivity and is preferably a ceramic material such as a material comprising $Al_2O_3$, $TiO_2$ or $XTiO_3$ where X is a group II element.

Measurements have now been made on the behavior of a deflector of the kind used in the Lynx system (having an axial length of about 9 mm) and of a similar deflector with only 3 mm axial length. The measurements were made with a precision waveguide system consisting of a coaxial-to-waveguide transition, an intermediate waveguide section ($TE_{10}$, with the same dimensions as in the Lynx system: 25×86 mm), and finally another waveguide-to-coaxial transition, loaded by a perfect matching resistor. The measurements were made at three frequencies, to ascertain that any deviating inherent resonant frequency of the deflector was considered.

The deflector virtually changes the active applicator length in order to match a standing wave maximum to a heated sample with different dielectric properties. The deflector is formed like an elliptic ring with a specified thickness. This thickness is of crucial importance for a proper deflector function. The reflection coefficient and phase factor have been determined using a network analyser and a specially designed test rig.

Figure 7A:
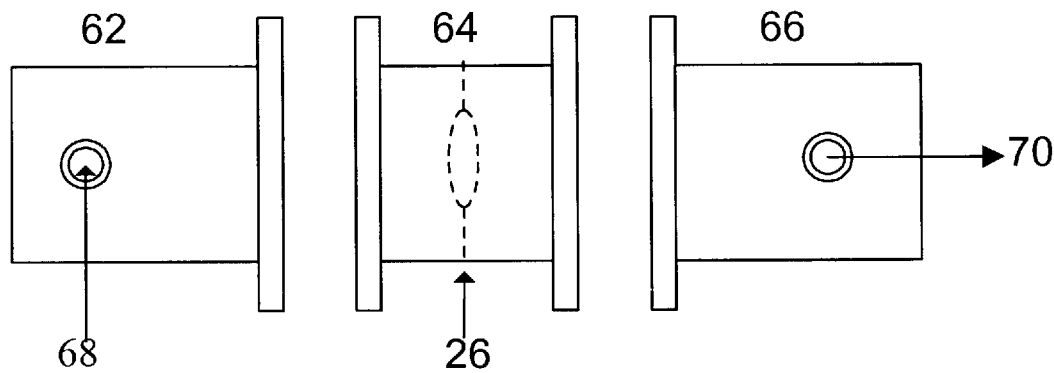
FIGS. 7A and 7B show an illustration of a test rig used for experimental verification of the properties of the apparatus according to the present invention.
Figure 7B:
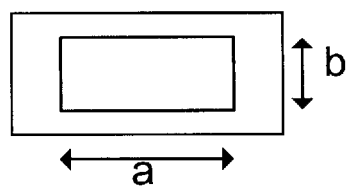

A specially designed test rig was constructed to exclusively study the effects of the deflector on the reflection coefficient and phase behaviour of irradiated microwaves. The test rig is schematically depicted in FIG. 7A. The rig is divided in three parts, where part 62 a $TE_{10}$—wave guide terminated in a 50 Ω load 70, part 64 a $TE_{10}$—wave guide deflector section, and part 66 is a $TE_{10}$—wave guide connected to a network analyser 70. FIG. 7B shows a cross section of all deflector parts having dimensions a=86 mm and b=25 mm. A deflector 26 is placed in the middle of the deflector section 64 and at a height of 12 mm. The deflector 26 can be rotated 180° around its axis. The complex reflection coefficient was measured experimentally at 2440, 2455 and 2470 MHz with an HP8719A network analyser for different deflector angles.

Figure 3A:
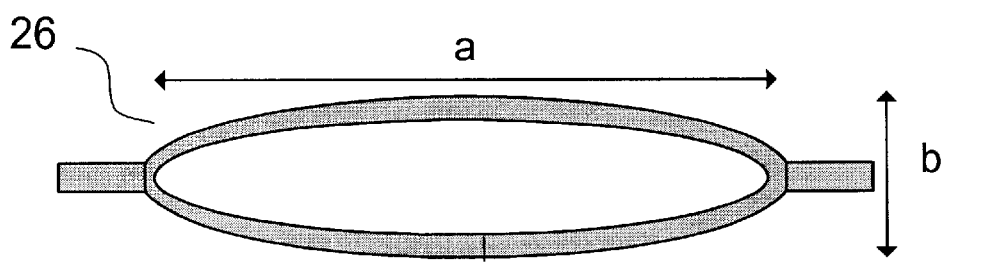
FIGS. 3A and 3B show an illustration of a deflector according to the present invention.
Figure 3B:
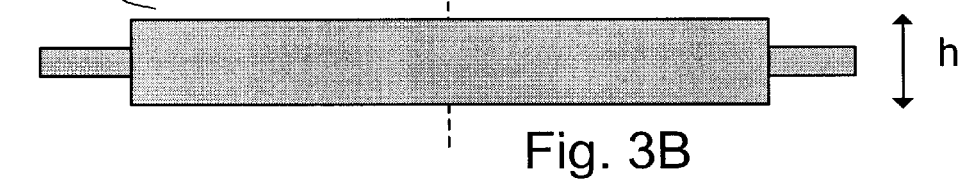

The deflector 26 used in the test is a three-dimensional elliptic ring made of aluminium similar to the deflector shown in FIG. 3. Two different deflectors have been tested here: one with a thickness of 8.90 mm and one with a thickness of 3.10 mm. The closed loop of the deflector defines a deflector plane which is the plane of the paper in FIG. 3A. Also, the closed loop defines an axis shown in FIG. 3B which is normal to the deflector plane. The dimensions of the detector used in the test are summarised in Table 1.

TABLE 1

| Height a [mm] | Width b [mm] | Axial thickness h [mm] |
|---|---|---|
| 17 | 68 | 8.90/3.10 |

The experimental data obtained in the test rig can only be used qualitatively if the zero-phase at the deflector position is not known. This phase can be determined and compensated using the following method.

Part 62 of the test rig is removed from part 64 and replaced with a short circuit wall of aluminium. No deflector is mounted in the deflector section. The amplitude and phase of radiation reflected from the short circuit wall was measured at 2440, 2455 and 2470 MHz. The data are presented in Table 2.

TABLE 2

Reflection coefficient data for the short-circuit measurements

| Frequency (MHz) | Amplitude (mV) | Phase (°) |
|---|---|---|
| 2440 | 980 | −169.5 |
| 2455 | 977 | 177.3 |
| 2470 | 981 | 166.4 |

These values compare to the reflection coefficient at the short circuit wall. The phase factor at the deflector position can be calculated by first measuring the distance L from the short circuit wall to the deflector position. The L-distance is determined to 58.43 mm. The phase is turned counter clockwise when you move towards the generator. The phase turns 180° for every $\lambda_g/2$, i.e. half of the guide wavelength. Therefore the shift in phase when moving from the short-circuit wall to the deflector position can be determined according to:

$$\Delta\varphi = \frac{2L}{\lambda_g} \cdot 180° \quad (1)$$

The wave-guide wavelength $\lambda_g$ for the different frequencies is calculated using the formula:

$$\lambda_g = \frac{\lambda_0}{\sqrt{1 - \left(\frac{f_c}{f_0}\right)^2}} \quad (2)$$

Here, $\lambda_0$ is the vacuum wavelength (=$c_0/f_0$ where $c_0$ is the velocity of electromagnetic wave in vacuum), $f_c$ is the cut-of frequency of the wave-guide and $f_0$ is the excitation frequency. The cut-of frequency is given by the expression:

$$(f_c/f_0)^2 = \left(\frac{\lambda_0}{2}\right)^2 \left[\left(\frac{m}{a}\right)^2 + \left(\frac{n}{b}\right)^2\right] \quad (3)$$

Here, (m,n) are the mode indexes (1,0 in our case) and a and b are the guide width and height respectively. The phase at the deflector position can then finally be calculated using the formula:

$$\varphi_{deflectorposition} \times \varphi_{shortcut} + \Delta\varphi \quad (4)$$

The phase at the deflector position and other data are used for the calculation are collected in Table 3.

TABLE 3

Experimental and derived data for the zero phase calculations

| $f_0$ (MHz) | $\lambda_0$ (m) | $\lambda_g/2$ (m) | $\varphi_{sc}$ (°) | $\Delta\varphi$(°) | $\varphi_{dp}$ (°) |
|---|---|---|---|---|---|
| 2440 | 0.12287 | 0.0878 | −169.5 | 119.788 | −49.712 |
| 2455 | 0.12211 | 0.0867 | 177.29 | 121.308 | −61.402 |
| 2470 | 0.12137 | 0.0857 | 164.4 | 122.795 | −72.805 |

The complex reflection coefficient (i.e. both the amplitude and phase) was measured for different angles in the interval 0–300° at the three frequencies given in Table 3 above using the two different axial thickness given in Table 1. The results are presented in the next section.

Figure 8:
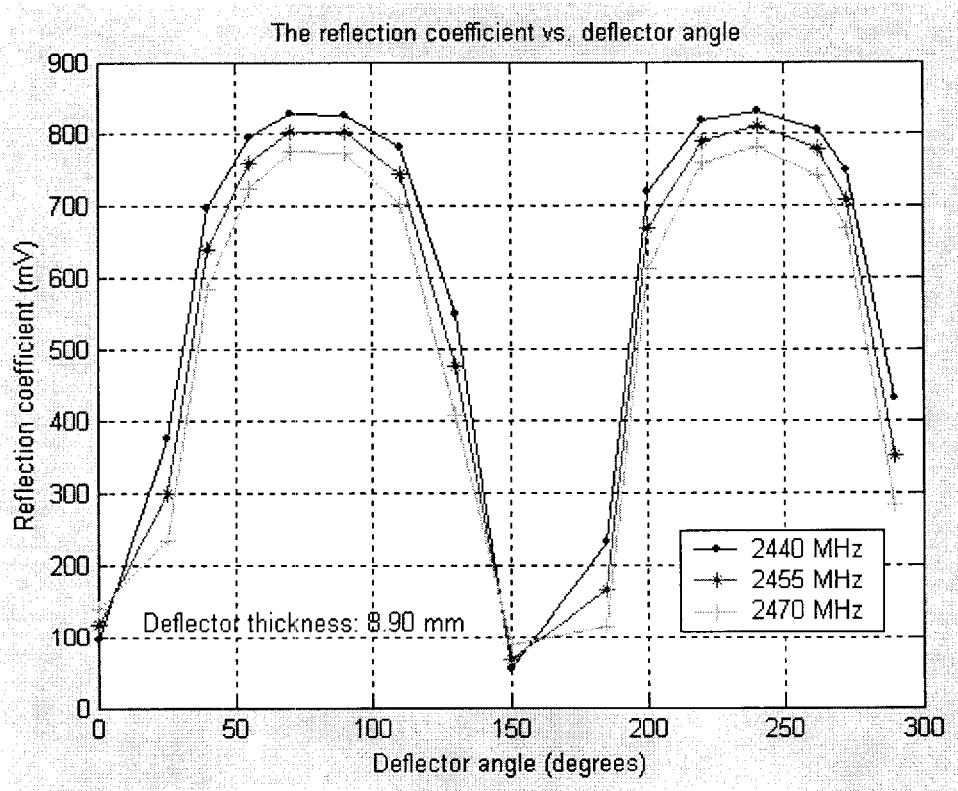
FIGS. 8 to 13 are various graphs showing experimental data obtained using the test rig of FIG. 7.
Figure 9:
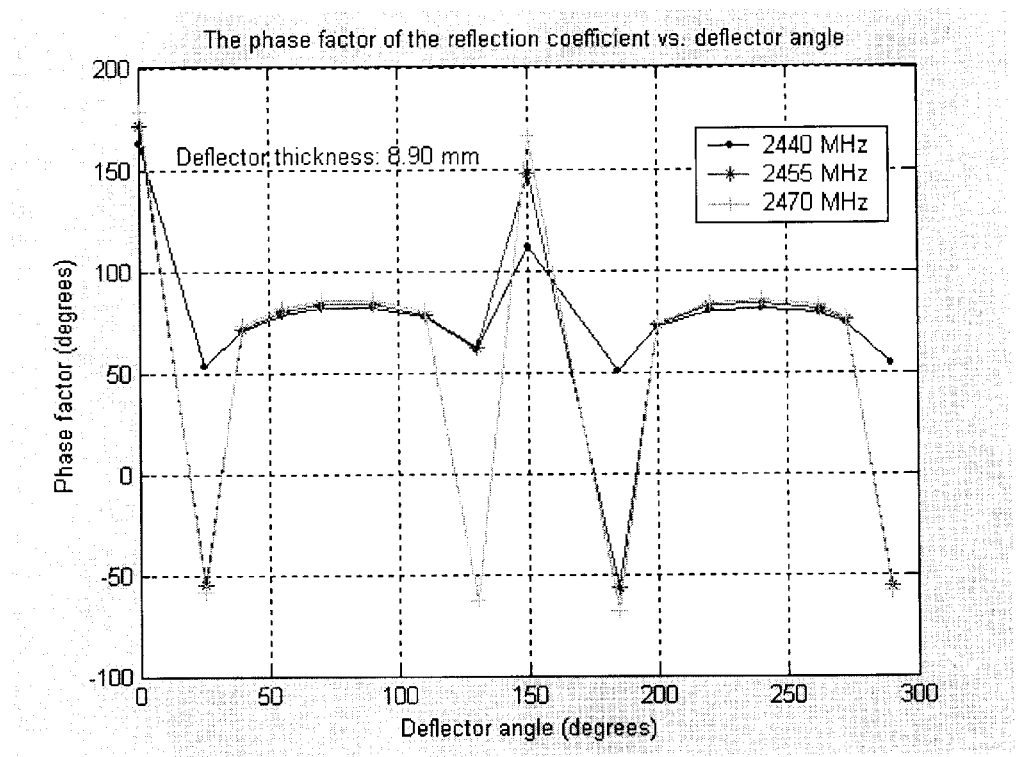
Figure 10:
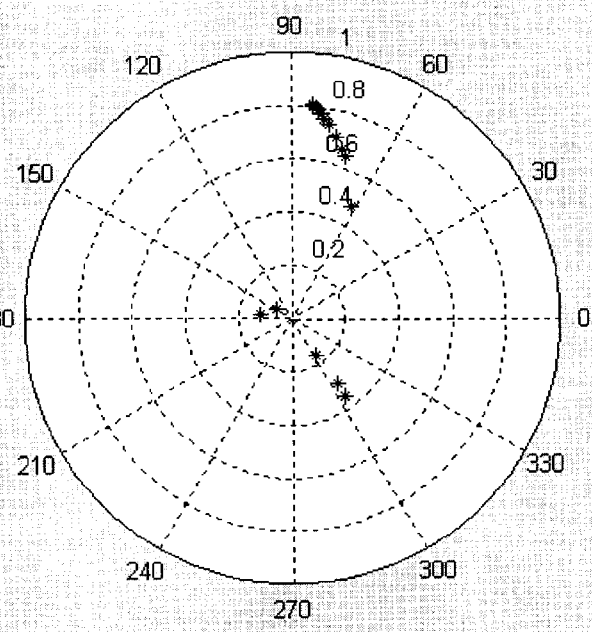

The reflection coefficient amplitude for the 8.90 mm deflector is shown in FIG. 8 for different deflector angles and the three excitation frequencies. The amplitude reaches above 800 mV in the interval 50–100° and 210–270° for all frequencies. The amplitude drops to just 150–200 mV in the interval 150–180°. This is in good agreement with the expected results illustrated in FIG. 6. The corresponding phase factor vs. deflector angle is depicted in FIG. 9 for the 8.90 mm deflector. The phase is constant around 80° for a deflector angle in the interval 50–100° and 210–270° for all frequencies, which coincide with the interval for the amplitude maximum. FIG. 8. FIG. 10 shows both the amplitude and the phase of the reflection coefficient in a polar diagram with the deflector angle as parameter at 2445 MHz (extracts from FIGS. 8 and 9).

Figure 11:
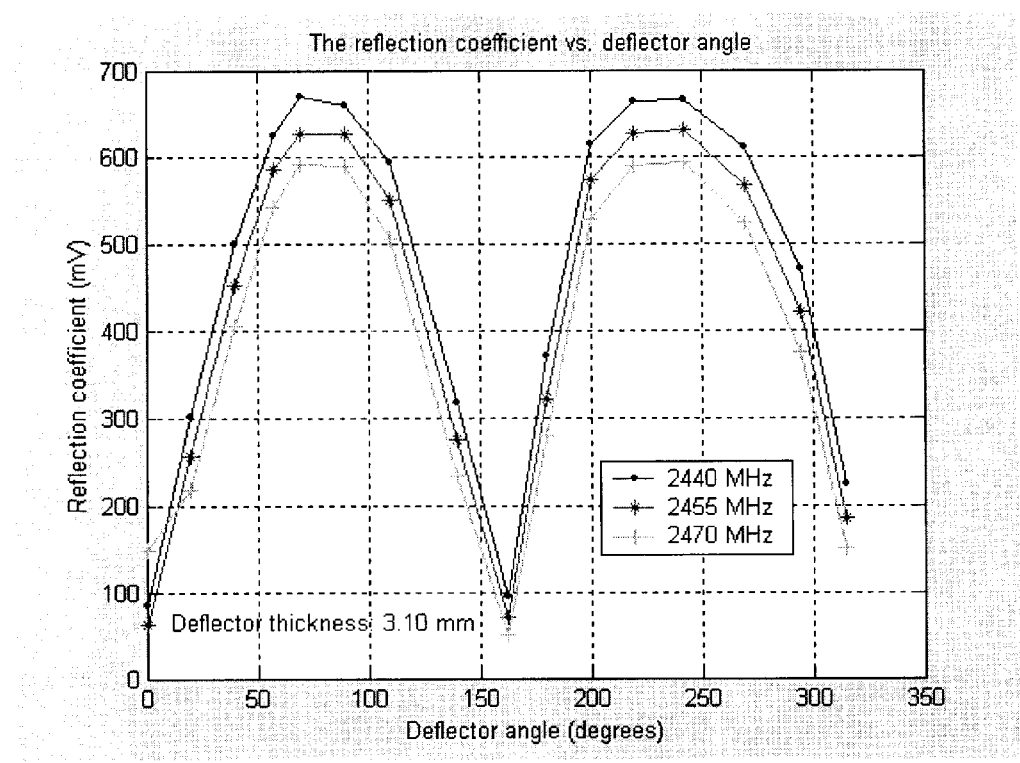
Figure 12:
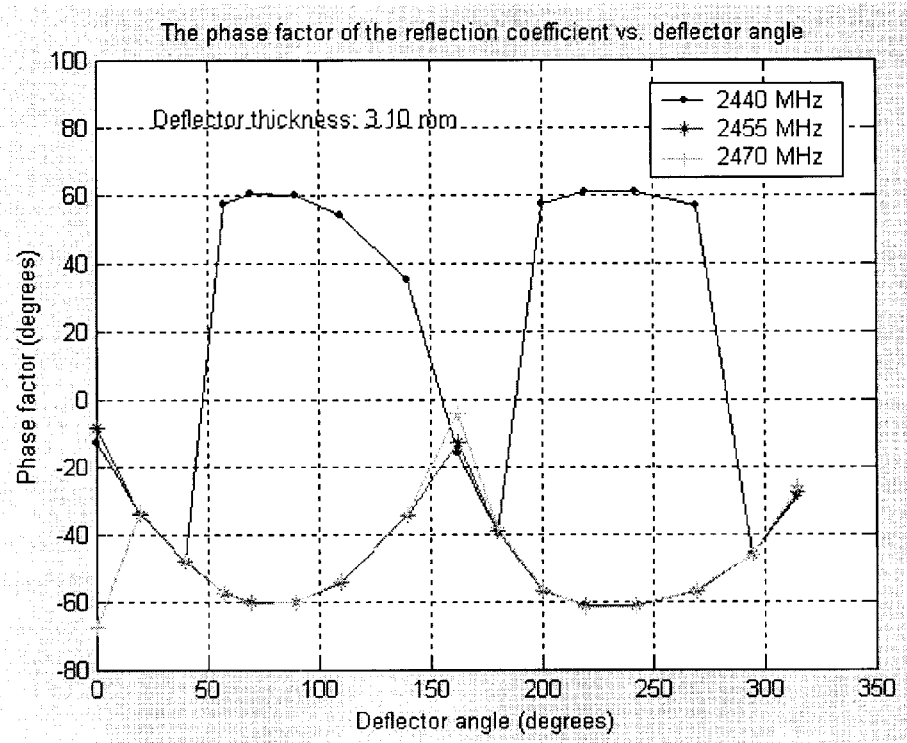
Figure 13:
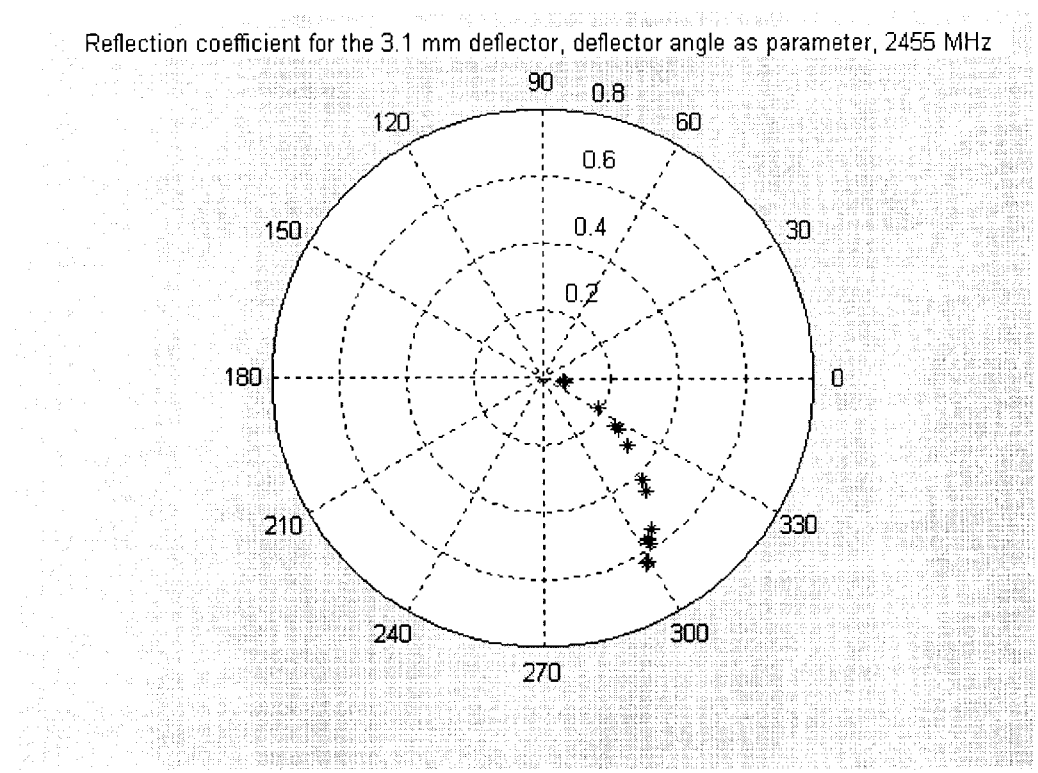

The reflection coefficient amplitude for the 3.10 mm deflector thickness is presented in FIG. 11 for different deflector angles and three different frequencies. The amplitude behaviour is similar to the values for the 8.90 mm deflector in FIG. 8. The phase factor for the 3.10 mm deflector is shown in FIG. 12 for different deflector angles and for the frequencies 2440, 2455 and 2470 MHz. The phase factor reaches a value of 60° for the 2440 MHz in the interval 50–125° and 200–270°. This maximum in phase coincides with the maximum of reflection coefficient amplitude for 2440 MHz. However, the phase factors at 2455 and 2470 MHz are shifted to a minimum value of −60° in the same angle interval as the 2440 MHz-curve. The thicker deflector is therefore capable of showing a high reflection coefficient amplitude and constant phase close to 90° in the frequency band 2440–2470 MHz. The thinner deflector shows high reflection coefficient amplitude, but shows a lower absolute value of the phase factor and it changes sign in the frequency band. FIG. 13 shows both the amplitude and the phase of the reflection coefficient in a polar diagram with the deflector angle as parameter at 2455 MHz (extracts from FIGS. 11 and 12).

In summary, the 8.90 mm deflector shows both a high reflection coefficient of 800 mV and a positive phase factor close to 90° for the three frequencies 2440, 2455 and 2470 MHz. The 3.10 mm deflector shows high reflection coefficient amplitude for the three frequencies, similar to the 8.90 mm deflector. The phase factor for the 3.10 mm deflector is also lower and changes sign in the frequency band.

The most important feature to consider is how the phase of the mismatch varies with deflector angle. The second most important feature is how the absolute value of the mismatch (i.e. reflection back by the deflector) varies with deflector angle. A third, more practical feature, is how sensitive the deflector angle is with regard to changes of the two previous features, i.e. if the system becomes mechanically sensitive because of very rapid variation of data for small angle changes. The phase curve for the 8.9 mm (normal) deflector shows that the phase moves towards the generator when it is turned towards a blocking position, i.e. deflector angle equal to 90° or 270°=with the axis along the waveguide. Of course, since the deflector is passive and symmetrical it is also reciprocal, which means that also the phase on the "shadow side" (i.e. in the cavity) changes so that the resonant frequency must increase when the deflector is moved towards 90°. This behavior is desirable. The phase curve of the 3 mm deflector behaves quite differently, the phase change is not in the desirable way.

Another important feature of the deflector is its blocking capability in the blocking position. Even if it is possible to achieve an extremely efficient blocking (so that perhaps less than 1‰ leaks through), this is not practical in heating systems, since too high field strengths may then be achieved without a load or with a non-absorbing load. Actually, the former situation may cause heating until melting of the glass container. Hence, the deflector used is preferably intentionally de-tuned to avoid that problem. This is evidenced by the blocking data. The de-tuning can be made either by detuning the inherent resonant frequency of the deflector, or by deforming it in such a way that it leaks. In the preferred embodiment, the latter was chosen, by choosing a non-optimal ellipticity. This choice further contributes to the favorable phase variation with deflector angle.

In the experiments described in the previous sections, it was not possible to vary the frequency continuously in order to find the resonance frequencies for the cavity for different detector angles and thereby directly show the change in the resonance frequency width varying deflector angles. However, despite the low resolution in the deflector angle, different reflected amplitude minima for the three frequencies is implied by the asymmetry of the minima between 150°–180° in FIG. 8. Clearly, the resonance frequency increases for increasing deflector angle between 150°–180°.

Figure 14:
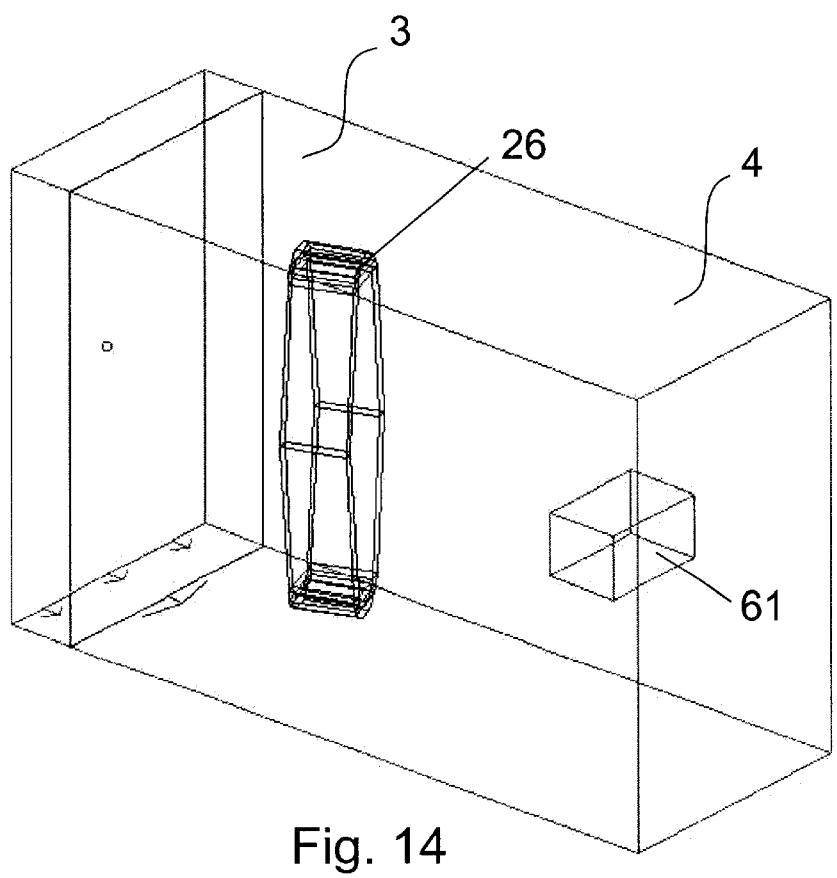
FIG. 14 shown a schematised drawing of an apparatus according to the present invention used in a computer simulation used for theoretical verification of the properties of the apparatus according to the present invention.

The effect of the deflector in the waveguide in front of the waveguide applicator has been modeled using the QWED s.c. (Poland) QW3D software. A complete model with both a rotatable deflector and a realistic load in the cavity have been used and resonant frequencies and coupling factors as function of the deflector angle, with the load permittivity as parameter, have been obtained. The modeling software editor image is shown in FIG. 14 with the waveguide 3, the deflector 26, the waveguide applicator 4, and a simulated load 61. The dimension of the waveguide, the deflector, and the waveguide applicator are similar to those used in the experiment described in relation to FIG. 7. A number of scenarios have been modeled where the reflection coefficient is calculated as a function of the frequency for a given deflector angle and load. Hence, for each scenario, the resonance amplitude can be read directly. The scenarios covers two axial thickness' of the deflector, 3 mm and 10 mm and a number of different loads is used in the simulation, load #3, #4, and #5.

Figure 15:
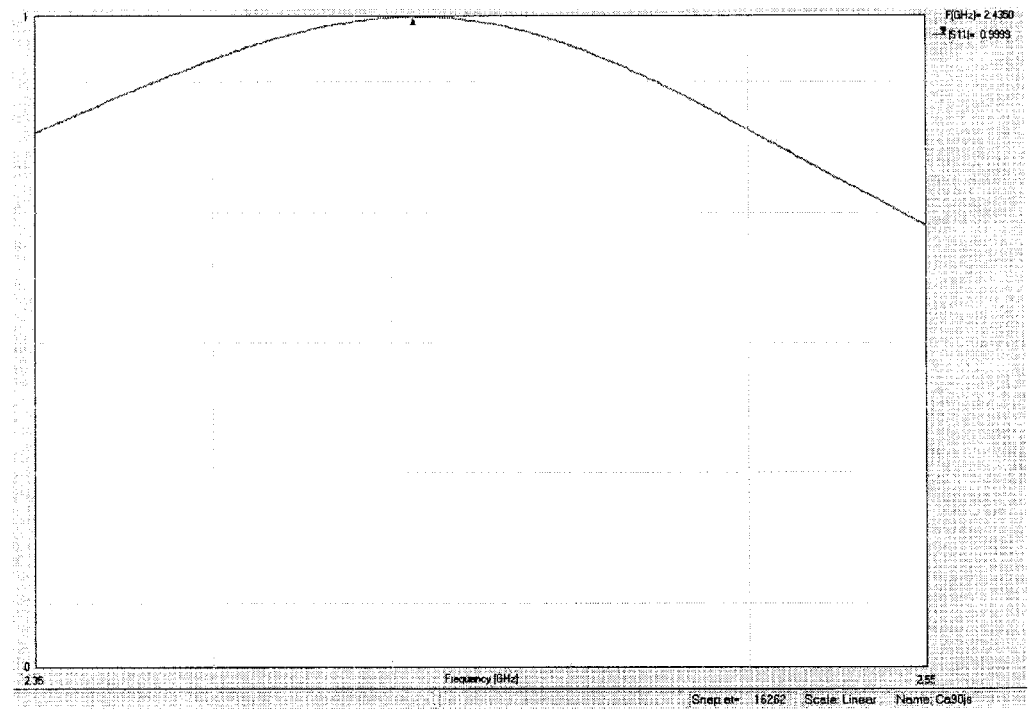
FIGS. 15 to 20 are various graphs showing data obtained from the simulation.

The graph in FIG. 15 shows the reflection coefficient as a function of the frequency for the deflector at 90° which is the blocking position (axis of the deflector parallel to the waveguide) and no load. As can be seen, the reflection factor at the resonant frequency of the deflector 2435 MHz is 0.9999, meaning that only 1 minus this squared (i.e. 0.2‰) leaks through. The modeled deflector is more blocking than the real one due to software limitations, which necessitates drawing of a perfect elliptical geometry of the deflector in order to allow quick and simple rotation in the scenarios.

Figure 16:
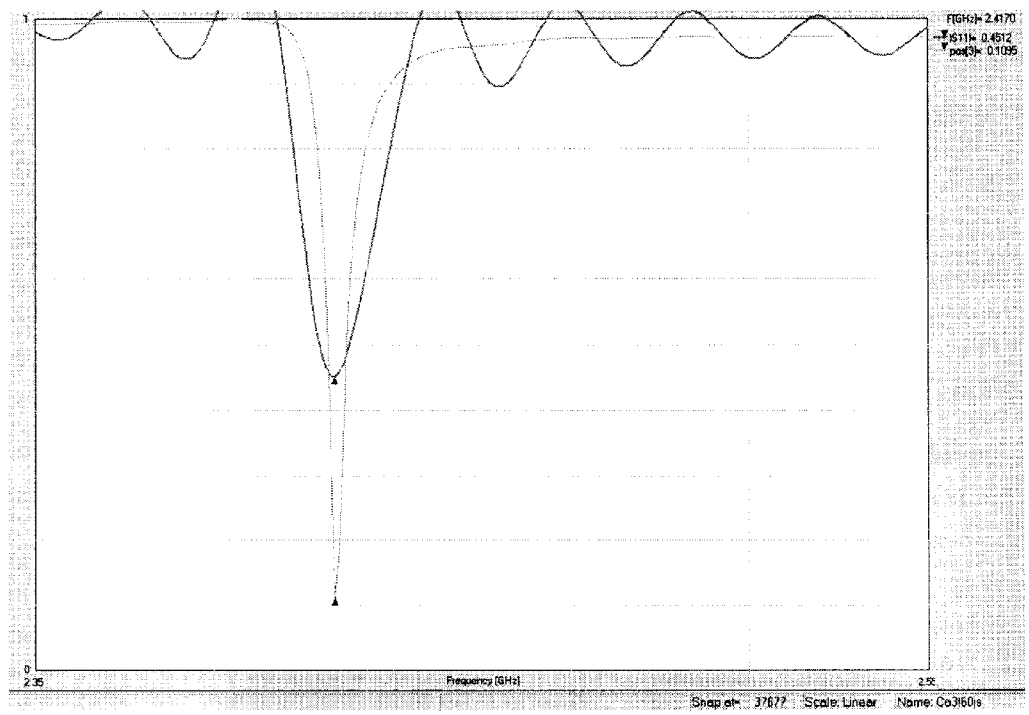

FIG. 16 shows the amplitude of the reflection coefficient width a deflector angle of 60° using the 10 mm deflector and load #3. The wavy black curve is obtained by the software after about 38000 iterations. However, the curve is by no means the stationary solution, so a special optional so-called Prony module was also used. It basically curve-fits the black curve to a number of Lorentzians, by a method far more advanced than inverse Fourier transformations. The resulting gray curve is clearly seen to be quite stabilized with a resonance at 2417 MHz. The amplitude of the reflection coeficient at resonance is 0.45, but about 0.9 at 2450 MHz. The deflector angle is thus not optimal.

Figure 17:
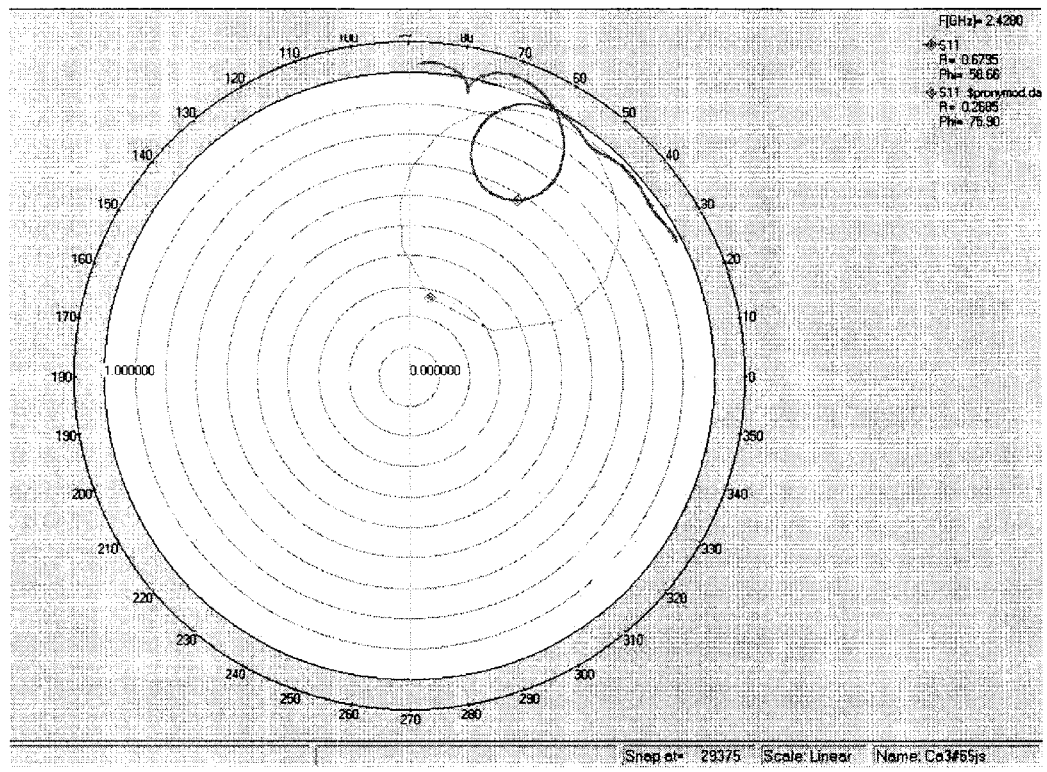

By increasing the deflector angle to 65° (still 10 mm deflector and load #3) one obtains the polar diagram shown in FIG. 17 which shown both the amplitude and phase of the reflection coefficient as a function of the frequency. Again, the black curve is obtained after a large number of iterations and the gray after having applied the Prony module. The system is now undercoupled (the curve in polar co-ordinates does not include the origo). Actually, the typical difficulty with any system matching device for low-loss loads is to avoid overcoupling; undercoupling means that the "choking" of the wave is stronger than 15 optimum. The resonant frequency (lowest amplitude) is now up from 2417 to 2428 MHz and amplitude of the reflection coefficient at resonance is 0.27.

Figure 18:
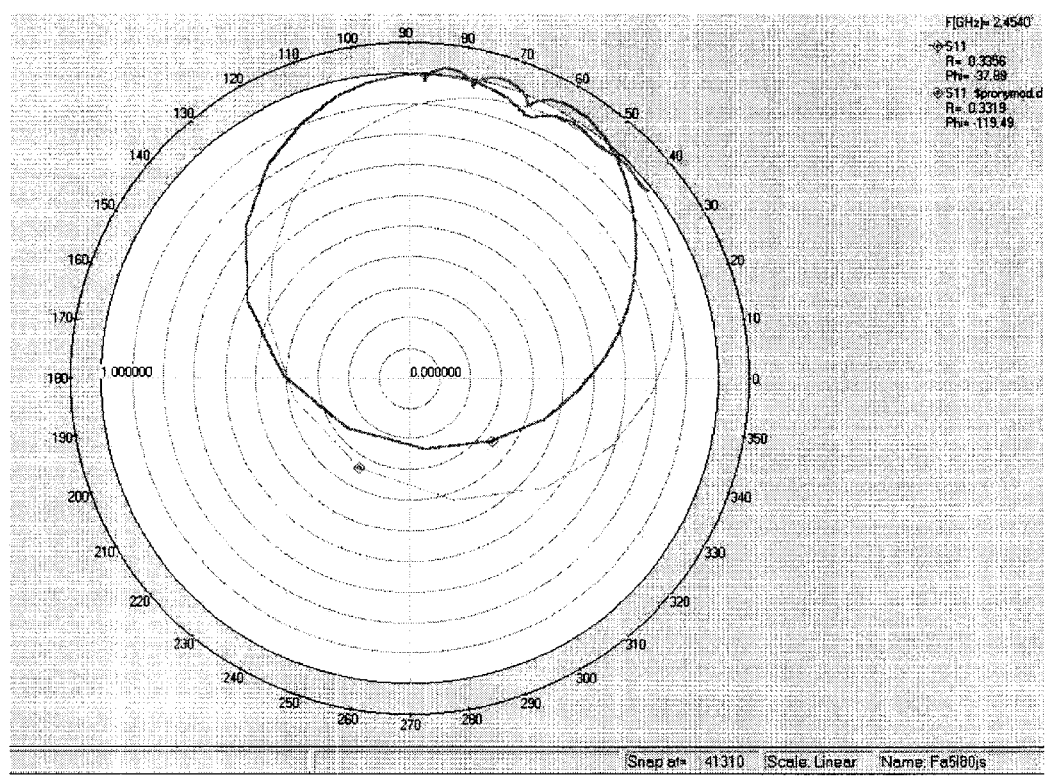

Using load #5 and the 10 mm deflector, the systems resonant frequency is 2454 MHz and located at a deflector angle of 80°, which is also the optimum for lowest amplitude of the reflection coefficient, 0.37 overcoupled. This is shown in FIG. 18. The overcoupling compares to a coupling factor exceeding 1, which will sometimes happen especially with loads having a high absorption. When the angle of rotation is continuously changed in an overcoupled scenario, the coupling factor will decrease continuously and must be 1 at some frequency for some angle of rotation. One should imagine a continuous transition from the polar diagram of FIG. 18 to that of FIG. 17, the curve must intersect origo at some angle and some frequency. This frequency needs not be the resonance frequency of the cavity and hence good matching (coupling factor~1) may be obtained at overcoupled nonresonant conditions.

Figure 19:
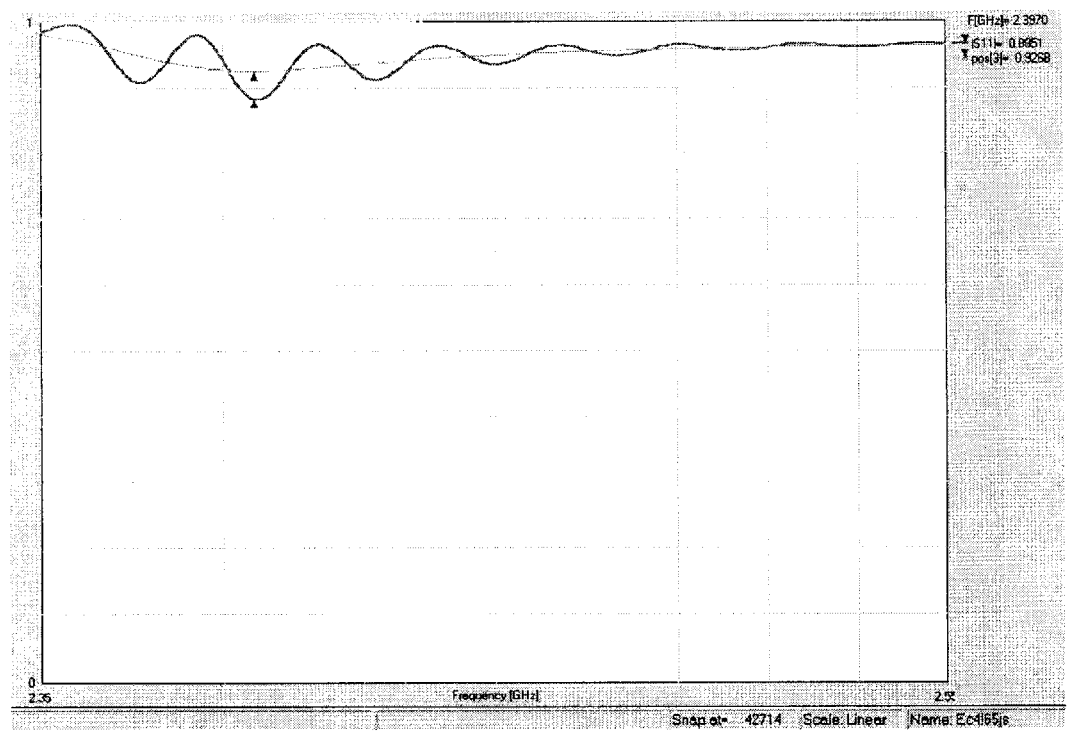
Figure 20:
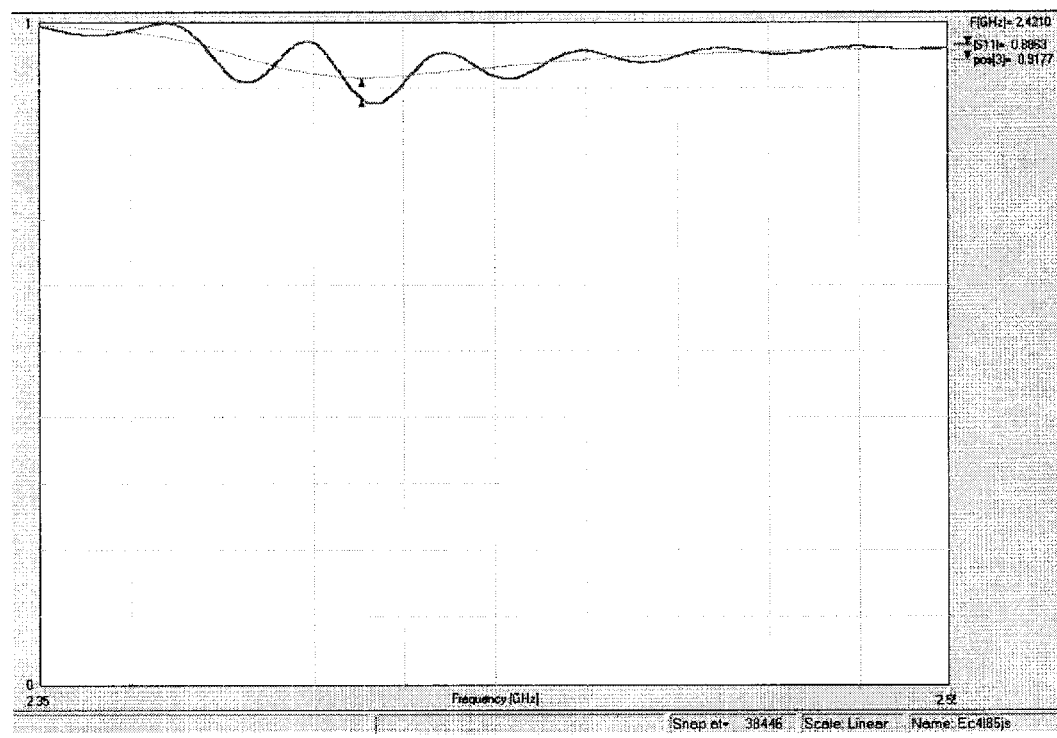

Now, using the 3 mm deflector and load #4, the graphs shown in FIGS. 19 and 20 was obtained. These graphs indicate that efficient resonant conditions are hard to achieve width the 3 mm deflector. Since both cases are strongly overcoupled, it becomes possible to use a still higher deflector angle, about 88°. However, it becomes exceedingly sensitive to adjust. In an effort to establish good resonant conditions, the cavity size was changed several times by moving the position (axis of rotation) of the deflector. Thus, in the simulations used to obtain FIGS. 19 and 20, the cavity is 12 mm shorter than that used with all modeling with the 10 mm deflector.

The shown graphs are just a representative selection of the obtained results. The following conclusions summarize the results of the modeling:

1. The 10 mm deflector provides desirable characteristics of the phase of the mismatch it is causing, by the standing wave phase moving clearly away from the deflector when it is rotated in the blocking direction. This property is favorable for waveguide cavities to which it is coupled, these cavities operating for heating of variable loads (between loads and loads being heated).

2. The angles of rotation needed to achieve the desired action using the 10 mm deflector are not as sensitive as for the 3 mm deflector, and will thus provide a possibility for smooth regulation.

3. There is, due to the very efficient blocking capability of axially long/thick deflectors, a possibility to "de-optimize"

them in two ways: by detuning of their inherent resonance (this is primarily by changing the peripheral length), and by deforming them (this is by changing the major/minor axis relationship, or using another curve form that the elliptical) for increased leakage without a strong phase change. The combination of these two possibilities and changing the axial length provides a multitude of options to modify the phase and reflection factor (i.e. the polar curve shape) as function of the deflector angle.

4. The deflector with a long length allows higher power handling.

In another preferred embodiment, the apparatus is adapted to perform plurality of heating processes in plurality single mode applicators simultaneously. In this second embodiment, the apparatus comprises one or more generator, two or more single mode applicators, and a waveguide adapted to guide radiation from the one or more generators to the two or more applicators. The waveguide is further adapted to distribute the guided radiation between the applicators, preferably by comprising components such as couplers, dividers, splitters, combiners and circulators.

Each of the single mode applicators preferably comprises the same features as the applicator of the first embodiment, 4 in FIG. 1. The apparatus also comprises a controller similar to the controller 7 of the first embodiment, further adapted to administrate the heating processes of all samples in the two or more applicators. The apparatus according to the invention is suited for performing chemical reactions such as organic synthesis, where a fast heating of a reaction mixture to a predetermined temperature is crucial to the purity of the final product. The reaction mixture may comprise one or more reagents such as organic compounds and optionally a catalyst. Often, the reaction mixture successively undergoes several reaction steps as in the process illustrated in FIG. 5, each for a given time at a specific temperature. Since different reaction mechanisms may dominate at different temperatures, the purity of each reactive step depends upon a high heating rate between the desired temperatures. The heating rate, $dT/dt$, is the temperature rise in the sample per time unit, typically measured in ° C./sec, and corresponds to the gradient of the curve segment 41 in FIG. 5.

Figure 4:
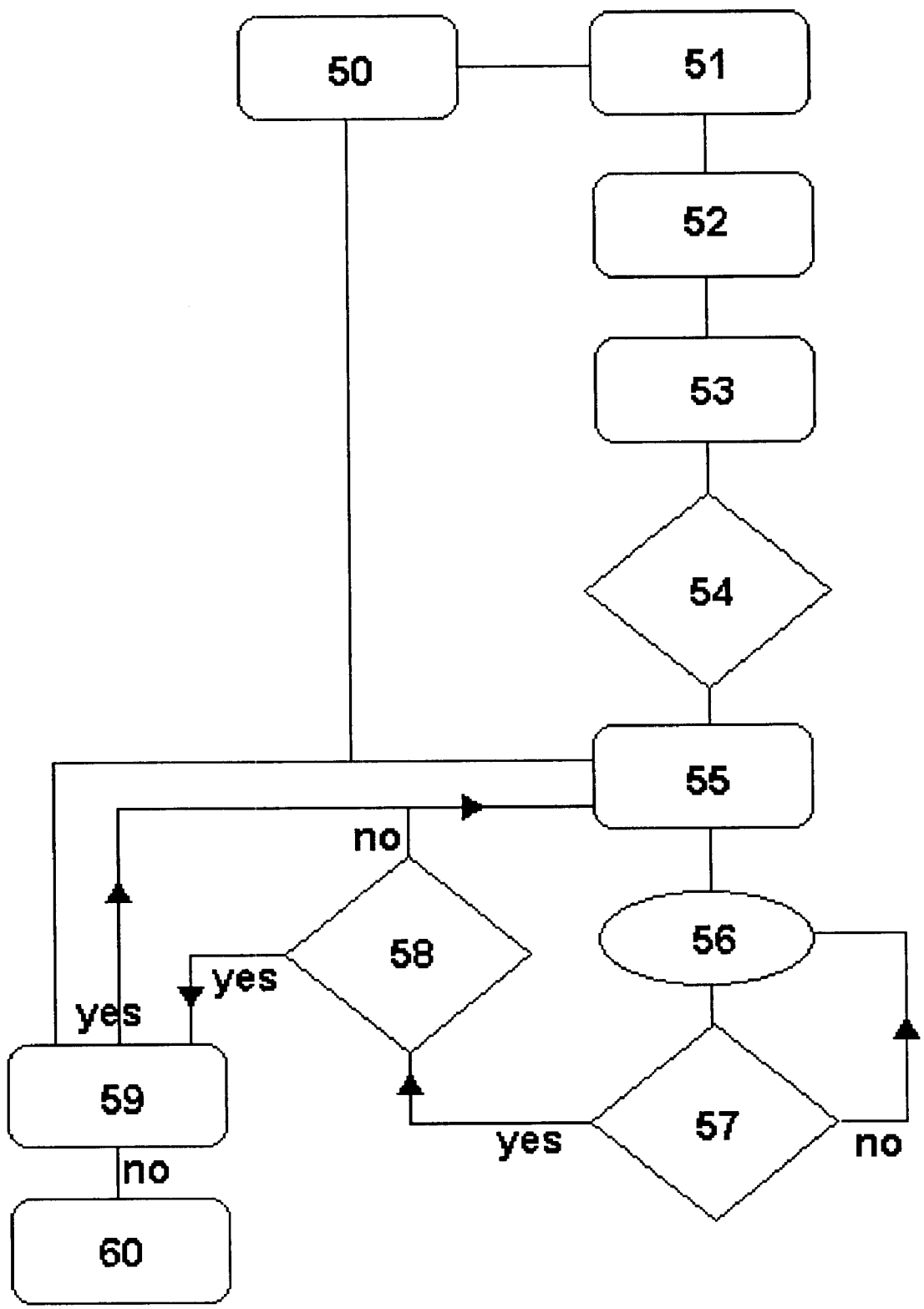
FIG. 4 is a flow diagram describing procedural steps of a heating process according to the present invention.

A heating procedure of a preferred embodiment is described in relation to the flow diagram in FIG. 4. Initially, in step 50, the user configures the heating process through the controller interface. This procedure comprises specifying the temperature $T_1$ the sample should reach and the time interval $t_1$ the sample should be kept at the constant temperature $T_1$. If the heating procedure is a series of reaction steps, this leads to a sequence $T_1, t_1; \ldots; T_i, t_i; T_n, t_n$ of reaction temperatures $T_i$ and corresponding time intervals $t_i$ corresponding to the heating/cooling process shown in FIG. 5. Temperatures $T_i$ are hereafter referred to as target temperatures and time intervals $t_i$ as target times.

Steps 51 through 54 in FIG. 4 describe a calibration procedure for determining some relevant properties of the applicator 4 with the specific sample 8. These relevant properties are obtained by recording the absorbed power in the sample during an operation cycle in deflector motion (e.g. 180° rotation or rotation and translation). Optionally, only relevant intervals in deflector motion are recorded. The recorded trace of absorbed power versus deflector position is referred to as the fingerprint of the sample, and is specific to several parameters such as the:

1. applicator design,
2. container design and material,
3. sample volume,
4. irradiated power,
5. centre frequency and frequency bandwidth of the radiation,
6. temperature of the sample (=container+sample), hence the "heating history" and thereby the heating rate,
7. chemical composition of the sample, hence its permittivity, degree of reaction etc. The parameters 1 through 5 can be held constant and are not related directly to the sample. Parameters 6 and 7 are the parameters of interest and hold information relating to the specific sample.

Figure 6:
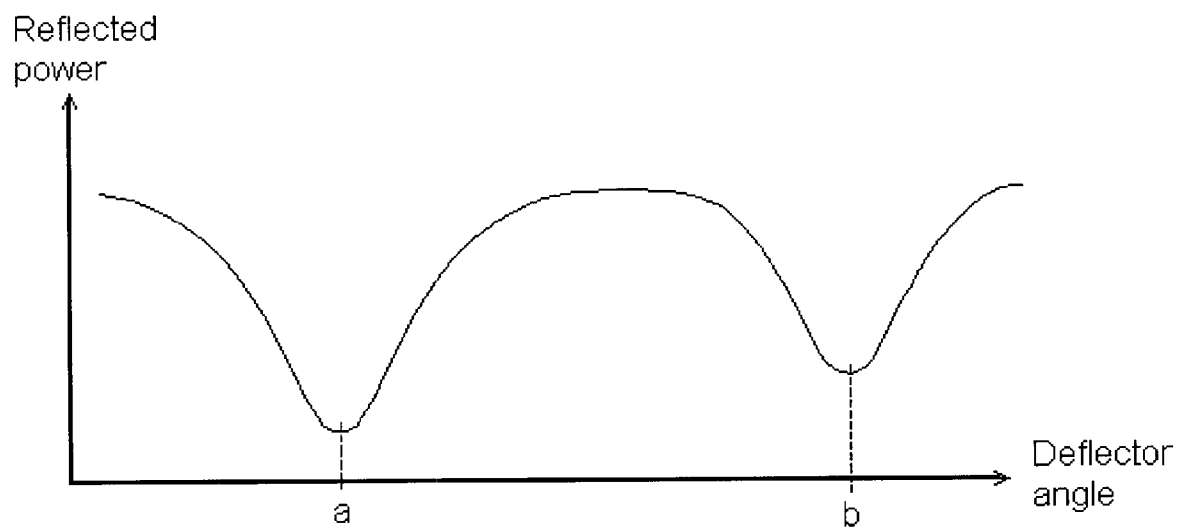
FIG. 6 is a diagram with a curve showing a sketch of a typical fingerprint of a sample according to the present invention.

A rough sketch of a typical fingerprint for the rotatable deflector 26 is shown in FIG. 6, where the reflected power is illustrated as a function of deflector angles from 0 to 180°. It is seen that the fingerprint has a symmetry corresponding to the symmetry of the diagonal positions of the deflector, i.e. an angle of 45 and 135 degrees. However, the two local minima a and b might have different shape and depth due to the asymmetric shape of the applicator. By processing the fingerprint, the deflector position corresponding to maximum absorption (=minimum reflection) can be determined.

In step 51 of FIG. 4, the deflector 26 is set to an initial position, which is preferably a position where neither maximum nor minima typically occur. The reason for this being that it is desirable to minimise the power absorbed in the sample during calibration; if the deflector starts near a typical maximum position, the sample will be exposed to undue power during the generator rise time. If the deflector starts near a typical absorption minimum, it will take unnecessary long time to determine the absorption maximum with a correspondingly large amount of absorbed power. A temperature rise in the sample during calibration is illustrated by the curve segment 40 in FIG. 5, but may be totally negligible.

The microwave generator 2 is started in step 52. The generator is preferably set to an output power level of 10–20 W during calibration. If the generator is a magnetron, there might be a minimum output power level for stable operation, this mininum level should be chosen if it is larger than 10–20 W. Semiconductor based generators have stable operation at very low output power levels. In the alternative configuration where the apparatus has a combination of a magnetron and a semiconductor based generator, the semiconductor-based generator is chosen in this low output power regime.

In step 53, the deflector is moved (continuously or stepwise) through a duty cycle such as a 180° rotation, and the reflected power is measured and stored for each angle to obtain a fingerprint. Optionally, the motion only covers a selected interval of interest in order to minimise the time spent and thereby the absorbed power. The output power level (and frequency for semiconductor based generators) and the temperature of the sample are preferably stored in relation to the fingerprint.

After the fingerprint has been recorded, the deflector position corresponding to absolute minimum in reflected power is determined in step 54, and the deflector is moved to this position. The apparatus is now ready to start a fast, efficient heating of the sample.

Figure 5:
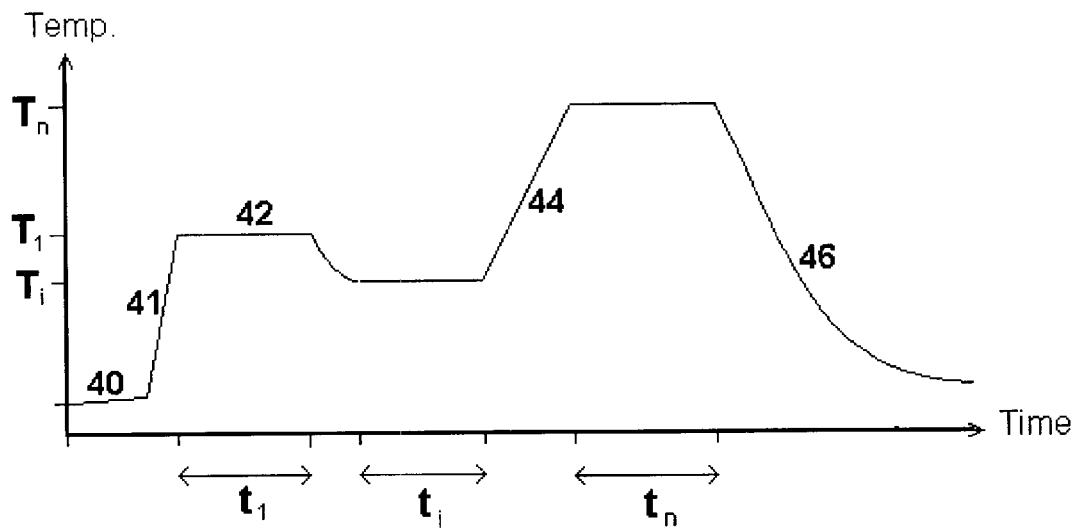
FIG. 5 is a diagram with a curve showing temperatures and time intervals of a heating process according to the present invention.

Steps 55 through 58 in FIG. 4 is a feedback loop which heats or cools the sample to the target temperature and stabilises the temperature around the target temperature, corresponding to the curve segments 41 and 42 in FIG. 5. The generator output power or the cooling by pressurised air is adjusted in step 55 depending of the present set of target values $T_i$, $t_i$ and the present temperature T. In the beginning of a heating procedure, the generator is preferably adjusted to the maximum output power level in order to achieve as large a heating rate as possible. If the sample is to be cooled, it is cooled by cooling he container with pressurised air (high cooling rate). Alternatively it is simply left to cool down by itself (low cooling rate).

Step 56 is the process that takes place, that is heating or cooling. When two or more starting materials reacts chemically they are subject to changes in their physical and chemical properties, such as changes in the dielectric properties. The energy transferred into the reacting materials is dependent of the dielectric properties of the starting and formed materials during the chemical reaction. The dielectric properties will therefore vary during the heating process resulting in a varying heating rate at different temperatures, as illustrated by curve segments 41 and 44 in FIG. 5. Therefore, it may be of interest to optimise the power absorption at temperatures between initial and target temperature by a running adjustment of the deflector in parallel with the heating. Hence the controller can optionally repeat step 53 and 54 of the calibration procedure at predetermined intervals. Step 53 and 54 records the fingerprint determines the deflector angle corresponding to absorption maximum and sets the deflector at the determined angle. This off cause implies a short period of reduced absorption, but results in enhanced absorption.

The controller monitors the temperature T, and step 57 of FIG. 4 is a check of whether the temperature T is larger or smaller than the target temperature $T_i$. If the generator is on, the procedure is a heating procedure, and if $T<T_i$ (=No if generator on), then the process 56 continues until next check (e.g. once every second). If $T>T_i$ (=Yes if generator on), a start time $t_0$ is set for calculating the time interval $t_i$ (only if no current $t_0$ is set) and the procedure proceeds to step 58. If the generator is off, the procedure is a cooling procedure and if $T>T_i$ (=No if generator off), then the process 56 continues until next check. If $T \leq T_i$ (=Yes if generator off), a start time $t_0$ is set for calculating the time interval $t_i$ (only if no current $t_0$ is set) and the procedure proceeds to step 58.

Optionally, the controller can stop or step-down the heating/cooling when the temperature is within a certain interval of the target temperature in order to minimise or avoid target temperature overshoot.

Step 58 checks whether $t-t_0 > t_i$, that is if the time interval $t_i$ has expired since the sample temperature $T_i$ was reached. If $t-t_0 < t_i$ (58=No) the procedure loops back to step 55 where the generator output power or the cooling is adjusted in response to the reading of step 57. The loop 55 to 58 is repeated until the target time has elapsed and the procedure proceeds to step 59 (58=Yes).

In step 59 it is determined whether all steps in the process sequence defined in step 50 have been performed. If not (59=No), step 55 through 58 is repeated with the new set of target values $T_i$, $t_i$. If all steps have been performed (59=Yes), all devices are turned off in step 60 and the sample can be removed from the applicator.

It is stressed that the procedure outlined above is a procedure according to a preferred embodiment. One or more steps may be changed, removed or added without changing the concept of the invention which is to execute a heating/cooling process such as the process illustrated in FIG. 5.

In a further embodiment, the controller may comprise, or have access to, a database of fingerprints and heating rates at different temperatures and volumes for a number of solvents. When initialising the heating procedure in step 50, the user can further specify the volume and the solvent so that the controller can find the relevant information in the database. With this information the controller can optimise the heating procedure in one or more of the following steps:

Adjust the deflector to give optimal power absorption in the sample without initial calibration, this would remove step 51 through 54.

Running adjustment of the deflector in parallel with the heating in order to ensure optimal power absorption at temperatures between initial and target temperature. Adjustment of deflector in e.g. step 57, but without performing any calibration since the optimal deflector angle at the current temperature is determined from the fingerprint in the database.

A faster adaptation of the appropriate power or coupling factor during a constant temperature feedback loop 55 to 58, e.g. through intelligent guesswork. Since the volume, the solvent and the target temperature is known the radiation losses can be calculated and the power absorption can be adjusted thereto by adjusting the deflector angle in correspondence with the fingerprint at target temperature.

Running determination of an indication of the chemical composition of the sample by comparing the fingerprint with a fingerprint of a known composition. This procedure may be advantageous in case of chemical reactions in the sample, since the degree of reaction for the chemical reaction can be monitored by comparing the fingerprint with a fingerprint of the chemical composition of a sample with the desired degree of reaction.

Database might be used to extract data resulting in a scaling function for each specific reaction:

S(T,P)=the absorbed power per volume unit [W/L] at a given temperature T and given power density P, where the power density P is the field strength at the position of the sample (ideally constant through the sample). S can be used to derive heating procedures for other apparatuses with other sample volumes, since it specifies the absorbed power and the heating rate dS/dT|P,T at given conditions, T and P, in said other apparatuses.

What is claimed is:

1. A heating apparatus comprising:
   generating means for generating electromagnetic radiation at a wavelength $\lambda$,
   a waveguide for guiding the generated electromagnetic radiation to a waveguide applicator for holding a sample to be heated, the sample having dielectric properties $\epsilon_{sample}$ which varies as a function of a temperature of the sample, the waveguide and the waveguide applicator supporting a single transverse mode,
   a deflector formed by a closed loop defining a plane, said deflector having an inherent resonance frequency $v_{defl}$ and a thickness of $\lambda/30$ to $\lambda/5$ in a direction normal to said plane, the deflector being rotatable around an axis being at least substantially parallel to said plane,
   the deflector being positioned in the waveguide so as to form a resonant cavity with the sample and the waveguide applicator, said cavity having at least one resonance frequency $v_{cav}$ being dependent upon at least $\epsilon_{sample}$, $v_{defl}$, and an angle of rotation of the deflector, $\alpha_{defl}$.

2. An apparatus according to claim 1, wherein the deflector deflects at least part of the guided electromagnetic waves so as to determine a coupling of the guided waves from the waveguide to the waveguide applicator.

3. An apparatus according to claim 1, wherein the deflector has a thickness $\lambda/20$ to $\lambda/10$ in a direction normal to the plane of the deflector.

4. An apparatus according to claim 1, wherein the deflector is shaped like an ellipse having a major principal axis a and a minor principal axis b.

5. An apparatus according to claim 1, wherein the deflector is shaped like a trapezium, such as a rectangle having a width a and a height b.

6. An apparatus according to claim 5, wherein the deflector is shaped like a rectangle having a width a and a height b.

7. An apparatus according to claim 1, further comprising a member of a material having a relative permittivity larger than 5, positioned within the waveguide applicator for adjusting the resonance frequency of the cavity and/or the coupling of the guided waves between the waveguide and the waveguide applicator.

8. AC An apparatus according to claim 7 wherein the material of the member comprises ceramic materials comprising one or more materials selected from the group consisting of $Al_2O_3$, $TiO_2$ or $XTiO_3$, where X is any group II element.

9. An apparatus according to claim 8 wherein X is Ca or Mg.

10. An apparatus according to claim 7, wherein the relative permittivity and/or the shape and/or the size of said member is chosen so as to make the cavity resonant at a predetermined set of conditions.

11. An apparatus according to claim 10, wherein the predetermined set of conditions include the sample volume, the sample permittivity, and the coupling of the guided waves between the waveguide and the waveguide applicator.

12. An apparatus according to claim 7, wherein the material has a relative permittivity larger than 10.

13. An apparatus according to claim 12, wherein the material has a relative permittivity larger than 25.

14. An apparatus according to claim 1, further comprising means for adjusting the position of the sample in the waveguide applicator in order to adjust the resonance frequency of the cavity and/or the coupling of the guided waves between the waveguide and the waveguide applicator.

15. An apparatus according to claim 14, further comprising supporting means for supporting a container holding the sample, wherein the means for adjusting the position of the sample comprises means for adjusting a substantially vertical position of said supporting means.

16. An apparatus according to claim 1, further comprising a first circulator and a first dummy load, said first circulator being adapted to deflect at least part of electromagnetic radiation reflected from the applicator towards the first dummy load.

17. An apparatus according to claim 1, further comprising at least one power measuring means being adapted to measure power of at least part of the electromagnetic radiation deflected from a circulator.

18. An apparatus according to claim 17 further comprising a first memory means for storing information from the at least one power measuring means.

19. An apparatus according to claim 1, wherein the generating means comprises a magnetron.

20. An apparatus according to claim 1, wherein the generating means comprises a semiconductor based generator and a semiconductor based amplifier.

21. An apparatus according to claim 20, wherein the semiconductor based amplifier comprises one or more silicon-carbide power transistors.

22. An apparatus according to claim 1, further comprising a thermal radiation sensitive element positioned so as to receive thermal radiation emanating from the sample.

23. An apparatus according to claim 22, wherein the thermal radiation sensitive element is adapted to determine a temperature of the sample.

24. An apparatus according to claim 1, wherein the applicator comprises a protection screen for separating the deflector and the waveguide from the sample, said screen being substantially transparent to the electromagnetic waves guided towards the waveguide applicator.

25. An apparatus according to claim 24, Wherein said substantially transparent screen comprises one or more of the materials selected from the group consisting of: PTFE (Teflon®)) TPX, polypropene or polyphenylidenesuiphide (PPS).

26. An apparatus according to claim 1, wherein the applicator comprises a drain for draining sample from within the applicator.

27. An apparatus according to claim 1, wherein the electromagnetic waves comprises microwaves having a frequency in the interval 300 MHz–300 GHz.

* * * * *